(12) United States Patent
Mikawa et al.

(10) Patent No.: US 10,903,571 B2
(45) Date of Patent: Jan. 26, 2021

(54) MAGNETIC FIELD COUPLING ELEMENT, ANTENNA DEVICE, AND ELECTRONIC EQUIPMENT

(71) Applicant: Murata Manufacturing Co., Ltd., Nagaokakyo (JP)

(72) Inventors: Kentaro Mikawa, Nagaokakyo (JP); Kenichi Ishizuka, Nagaokakyo (JP); Takafumi Nasu, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 79 days.

(21) Appl. No.: 16/269,642

(22) Filed: Feb. 7, 2019

(65) Prior Publication Data

US 2019/0173175 A1 Jun. 6, 2019

Related U.S. Application Data

(63) Continuation of application No. PCT/JP2017/042707, filed on Nov. 29, 2017.

(30) Foreign Application Priority Data

Nov. 29, 2016 (JP) .................................. 2016-231025
Dec. 28, 2016 (JP) .................................. 2016-255730

(Continued)

(51) Int. Cl.
*H01Q 1/50* (2006.01)
*H01Q 5/335* (2015.01)
(Continued)

(52) U.S. Cl.
CPC .............. *H01Q 5/335* (2015.01); *H01P 5/18* (2013.01); *H01Q 1/24* (2013.01); *H01Q 1/36* (2013.01);
(Continued)

(58) Field of Classification Search
CPC .......... H01Q 5/335; H01Q 1/24; H01Q 5/378; H01Q 21/0006; H01Q 1/36; H01Q 9/30
See application file for complete search history.

(56) References Cited

U.S. PATENT DOCUMENTS

| | | | |
|---|---|---|---|
| 2012/0325916 A1 | 12/2012 | Tsubaki et al. | |
| 2014/0049440 A1 | 2/2014 | Ueki et al. | |
| 2014/0176287 A1* | 6/2014 | Kato ....................... | H01F 5/003 336/200 |

FOREIGN PATENT DOCUMENTS

| | | |
|---|---|---|
| WO | 2012/032974 A1 | 3/2012 |
| WO | 2012/153690 A1 | 11/2012 |
| WO | 2015/182340 A1 | 12/2015 |

OTHER PUBLICATIONS

Official Communication issued in International Patent Application No. PCT/JP2017/042707, dated Feb. 20, 2018.

\* cited by examiner

*Primary Examiner* — Dieu Hien T Duong
(74) *Attorney, Agent, or Firm* — Keating & Bennett, LLP

(57) ABSTRACT

A magnetic field coupling element includes conductor patterns stacked with insulating layers interposed therebetween, and interlayer connection conductors that inter-connect the conductor patterns at predetermined positions. The conductor patterns include first, second, third, and fourth conductor patterns, and the interlayer connection conductors include first and second interlayer connection conductors. The first conductor pattern, the second conductor pattern, and the first interlayer connection conductor define a first coil, and the third conductor pattern, the fourth conductor pattern, and the second interlayer connection conductor define a second coil. The first coil and the second coil are disposed in a region of less than about ⅓ of a stacking height of a multi-layer body including the insulating layers.

20 Claims, 31 Drawing Sheets

(30) Foreign Application Priority Data

Apr. 18, 2017 (JP) ................................. 2017-082044
May 26, 2017 (JP) ................................. 2017-104651
Aug. 18, 2017 (JP) ................................. 2017-158219

(51) Int. Cl.
    *H01Q 5/378*     (2015.01)
    *H01Q 21/00*     (2006.01)
    *H01Q 1/36*     (2006.01)
    *H01Q 9/30*     (2006.01)
    *H01Q 1/24*     (2006.01)
    *H01P 5/18*     (2006.01)

(52) U.S. Cl.
    CPC ............... *H01Q 5/378* (2015.01); *H01Q 9/30* (2013.01); *H01Q 21/0006* (2013.01)

FIG. 10A  n=1.75
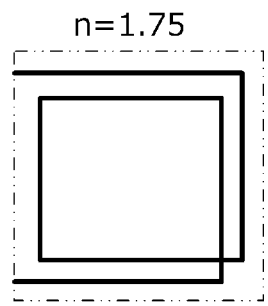
FIG. 10B  n = 2.25 (3 LAYERS)
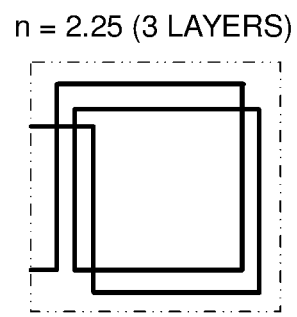
FIG. 10C  n=1
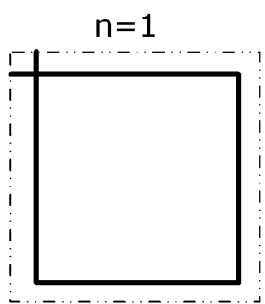
FIG. 10D  n=1.5
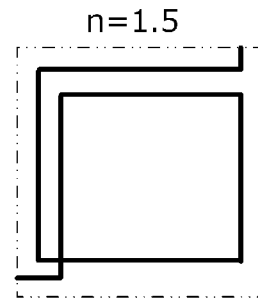
FIG. 10E  n=1.5
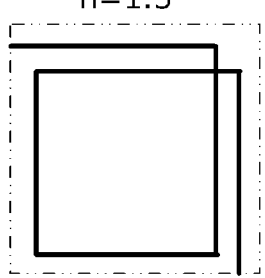
FIG. 10F  n=2
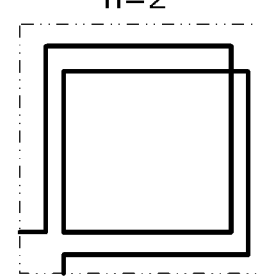
FIG. 10G  n=1.25
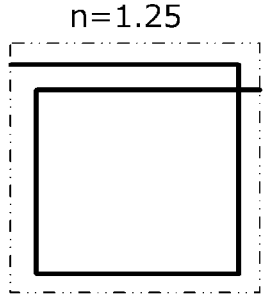
FIG. 10H  n=1.75
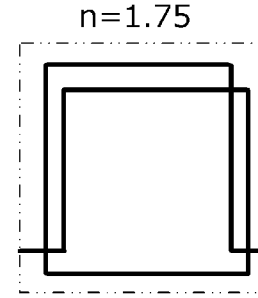

115

116

Freq.(1.7GHz to 2.7GHz)

Freq.(1.7GHz to 2.7GHz)

Freq.(1.7GHz to 2.7GHz)

MAGNETIC FIELD COUPLING ELEMENT, ANTENNA DEVICE, AND ELECTRONIC EQUIPMENT

CROSS REFERENCE TO RELATED APPLICATIONS

This application claims the benefit of priority to Japanese Patent Application No. 2016-231025 filed on Nov. 29, 2016, Japanese Patent Application No. 2016-255730 filed on Dec. 28, 2016, Japanese Patent Application No. 2017-082044 filed on Apr. 18, 2017, Japanese Patent Application No. 2017-104651 filed on May 26, 2017, and Japanese Patent Application No. 2017-158219 filed on Aug. 18, 2017, and is a Continuation Application of PCT Application No. PCT/JP2017/042707 filed on Nov. 29, 2017. The entire contents of each of the above-identified applications are hereby incorporated herein by reference.

BACKGROUND OF THE INVENTION

1. Field of the Invention

The present invention relates to a magnetic field coupling element that is used for a high-frequency circuit, an antenna device including the same, and electronic equipment.

2. Description of the Related Art

In order to broaden a frequency band or to comply with a plurality of frequency bands, an antenna device including two radiating elements that are directly or indirectly coupled to each other is used. In addition, International Publication No. 2012/153690 illustrates an antenna device including two radiating elements and a coupling degree adjustment circuit that controls power feeding to the two radiating elements.

FIG. 51 illustrates an example of conductor patterns on layers in a case in which the coupling degree adjustment circuit illustrated in International Publication No. 2012/153690 is formed on a multi-layer substrate. Each layer is formed of a dielectric sheet or a magnetic sheet, and conductor patterns are formed on material layers $51a$ to $51f$. In a range illustrated in FIG. 51, a conductor pattern 74 is formed on the material layer $51a$. A conductor pattern 72 is formed on the material layer $51b$, and conductor patterns 71 and 73 are formed on the material layer $51c$. Conductor patterns 61 and 63 are formed on the material layer $51d$, and a conductor pattern 62 is formed on the material layer $51e$. On a bottom surface of the material layer $51f$, a feeding terminal 81, a ground terminal 83, an antenna terminal 82 that is a connection port of a first radiating element, and an antenna terminal 84 that is a connection port of a second radiating element are individually formed. At predetermined positions in the plurality of material layers $51a$ to $51f$, an interlayer connection conductor represented by a dashed line extending in the vertical direction is formed. A right half of the conductor pattern 72 and the conductor pattern 71 define a coil element $L1a$. In addition, a left half of the conductor pattern 72 and the conductor pattern 73 define a coil element $L1b$. In addition, the conductor pattern 61 and a right half of the conductor pattern 62 define a coil element $L2a$. In addition, a left half of the conductor pattern 62 and the conductor pattern 63 define a coil element $L2b$.

In the above manner, the coupling degree adjustment circuit is defined by a transformer in which a primary coil (first coil) including the coil elements $L1a$ and $L2b$ and a secondary coil (second coil) including the coil elements $L2a$ and $L2b$ are coupled to each other.

In the antenna device illustrated in International Publication No. 2012/153690, the first radiating element and the second radiating element are coupled to each other via the transformer, and a feeder circuit and the antenna device are matched by a setting of the coupling. Since the first radiating element and the second radiating element do not have to be arranged in parallel to each other in the antenna device illustrated in International Publication No. 2012/153690, design of patterns for these has a high degree of freedom. In addition, even if the first radiating element and the second radiating element are closer to each other, a predetermined coupling degree is able to be set. This makes it easy to match the feeder circuit and a multi-resonance antenna.

However, a radiation characteristic of the radiating elements may be degraded when an inductance component of the transformer is large because inductances (primary inductance, secondary inductance, and leakage inductance) of the transformer cause a distribution of current generated in the radiating elements to vary. On the other hand, when the number of turns of the first coil and the second coil is decreased so as to reduce the inductance component of the transformer, a coupling coefficient between the two coils is decreased, and sufficient effects as the coupling degree adjustment circuit cannot be obtained.

SUMMARY OF THE INVENTION

Preferred embodiments of the present invention provide magnetic field coupling elements each with a small inductance component and a high coupling coefficient between the first coil and the second coil, antenna devices including the same, and electronic equipment.

A magnetic field coupling element according to a preferred embodiment of the present invention includes a plurality of conductor patterns provided on a plurality of layers that are stacked with insulating layers interposed therebetween; and a plurality of interlayer connection conductors that inter-connect the plurality of conductor patterns at predetermined positions; wherein the plurality of conductor patterns include a first conductor pattern, a second conductor pattern, a third conductor pattern, and a fourth conductor pattern that are disposed on different layers in order in a direction of stacking; the plurality of interlayer connection conductors include a first interlayer connection conductor and a second interlayer connection conductor, the first interlayer connection conductor inter-connects the first conductor pattern and the second conductor pattern to each other, the second interlayer connection conductor inter-connects the third conductor pattern and the fourth conductor pattern to each other, the first conductor pattern, the second conductor pattern, and the first interlayer connection conductor define a first coil, and the third conductor pattern, the fourth conductor pattern, and the second interlayer connection conductor define a second coil; and the first coil and the second coil are provided in a region of less than about ⅓ of a stacking height of a multi-layer body including the plurality of insulating layers in the direction of the stacking.

With the above configuration, a coupling coefficient is increased while inductances of the coils are reduced or prevented. In addition, unnecessary coupling with an electronic component or a conductor that is close to the periphery or another conductor pattern in the multi-layer body is reduced or prevented.

It is preferable that a coupling direction of the second conductor pattern and the third conductor pattern is the same as a coupling direction of the first interlayer connection conductor and the second interlayer connection conductor. This further increases the coupling coefficient between the first coil and the second coil.

It is preferable that the first interlayer connection conductor and the second interlayer connection conductor overlap with each other in a plan view of the insulating layers. Thus, since the interlayer connection conductors overlap with each other in a plan view, coupling between the first interlayer connection conductor and the second interlayer connection conductor, which are both disposed in the stacking direction, is added, and the coupling coefficient between the first coil and the second coil is increased. Further, since the interlayer connection conductors overlap with each other in a plan view, interference of the interlayer connection conductors with magnetic field coupling is less than that in a structure in which a plurality of interlayer connection conductors are dispersedly disposed in a plan view as in a structure of the related art. This effect also increases the coupling coefficient between the first coil and the second coil.

It is preferable that the first interlayer connection conductor and the second interlayer connection conductor are disposed in the direction of the stacking with a single insulating layer among the plurality of insulating layers interposed therebetween. This enables the first interlayer connection conductor and the second interlayer connection conductor to be closest to each other, thus improving the above-described advantageous effect of increasing the coupling coefficient.

It is preferable that the first conductor pattern and the fourth conductor pattern include a smaller number of turns than the second conductor pattern and the third conductor pattern. This reduces or prevents unnecessary coupling with an electronic component or a conductor that is close in the periphery.

It is preferable that at least one of the second conductor pattern and the third conductor pattern include a capacitance formation conductor pattern facing in the direction of the stacking and that partially provides a capacitance. This makes it possible to use the capacitance as an impedance matching circuit of a high-frequency circuit to be connected to the magnetic field coupling element.

It is preferable that one conductor pattern of the second conductor pattern and the third conductor pattern includes a lead conductor pattern that extends to an end portion of the insulating layers, and that the other conductor pattern includes a capacitance formation conductor pattern facing the lead conductor pattern. This makes it possible to use one of capacitance formation conductor patterns as the leading conductor pattern that is originally necessary, and the magnetic field coupling element is able to be downsized accordingly.

It is preferable that the plurality of insulating layers define a rectangular parallelepiped multi-layer body, that the multi-layer body includes a first surface and a second surface that is opposite to the first surface, and that a terminal connected to a first end of the first coil, a terminal connected to a second end of the first coil, a terminal connected to a first end of the second coil, and a terminal connected to a second end of the second coil are individually provided on the first surface and the second surface. With this structure, it is possible to mount the magnetic field coupling element on a circuit substrate using either the first surface or the second surface as a mount surface. In a case in which the first surface is used as the mount surface and in a case in which the second surface is used as the mount surface, a leading direction of the first end and the second end of the first coil and a leading direction of the first end and the second end of the second coil have a symmetrical relationship. Accordingly, the magnetic field coupling element is able to be mounted on a circuit substrate using either the first surface or the second surface as the mount surface in such a manner that the terminals are arranged at positions appropriate for the position of a circuit or an element to which the first coil and the second coil are connected.

An antenna device according to a preferred embodiment of the present invention includes a magnetic field coupling element according to a preferred embodiment of the present invention; a radiating element connected to the first end of the first coil; and a parasitic resonant circuit connected to the first end of the second coil, in which the second end of the first coil is a feeder circuit connection portion, and in which the second end of the second coil is connected to a ground.

With the above configuration, a frequency characteristic of a return loss of the radiating element seen from the feeder circuit is adjusted by a resonance characteristic of the parasitic resonant circuit, and a pole is generated in a desired frequency band to broaden the band of a frequency characteristic of the antenna.

It is preferable that a winding direction of the first coil from the second end to the first end and a winding direction of the second coil from the first end to the second end are opposite to each other. Thus, the inductances of the first coil and the second coil are reduced by a mutual inductance due to coupling between the first coil and the second coil, and influences on a circuit characteristic and a radiation characteristic of the radiating element are small.

It is preferable to further include a phase shifter that is connected between the feeder circuit connection portion and the first coil and that has a frequency dependency. This makes it possible to provide an antenna device that performs impedance matching in a wide band.

It is preferable that a second terminal of the second coil is connected to the ground, the second terminal being opposite to a first terminal to which the parasitic resonant circuit is connected, and that a length of a line between the first coil and the feeder circuit and a length of a line between the second terminal of the second coil and the ground are each less than about ⅛ wavelength of a resonant frequency.

Since the magnetic field coupling element mainly uses magnetic field coupling, the strength of coupling is increased when the magnetic field coupling element is disposed in a portion at which a strong current flows. The strong coupling improves the influence of resonance obtained by adding the magnetic field coupling element and the parasitic element, and since a resonant bandwidth is broadened, a frequency band in which communication is possible is broadened. In addition, a signal intensity is increased, and a communication characteristic is improved.

The antenna device may include at least one of an inductor and a capacitor that is connected between the second coil and the parasitic resonant circuit. Thus, since the inductor or the capacitor is disposed in a portion at which current is low, while a change in the coupling is reduced or prevented (change in impedance matching is reduced or prevented), the resonant frequency on the parasitic resonant circuit side is able to be decreased, and a desired communication band is obtained. Alternatively, while the resonant frequency is maintained, the length of the parasitic resonant circuit is able to be reduced, and thus the area used is able to be reduced.

The antenna device may include at least one of an inductor and a capacitor that is connected between the first terminal of the second coil and the ground. Thus, reactance generated by a parasitic capacitance between the ground and the magnetic field coupling element by insertion of the magnetic field coupling element is able to be reduced or prevented, and a change from a matching state in which the magnetic field coupling element is not mounted is reduced or prevented. In addition, the resonant frequency of the parasitic resonant circuit is decreased, and a desired communication band or communication characteristic is able to be obtained. Alternatively, while the resonant frequency is maintained, the length of the antenna is able to be reduced, and thus the area used is able to be reduced.

The antenna device may include at least one of an inductor and a capacitor that is connected between the first coil and the radiating element. Thus, the resonant frequency on the parasitic resonant circuit side is able to be increased, and a desired communication band is able to be obtained.

The antenna device may include at least one of an inductor and a capacitor that is connected between a first terminal of the first coil and the feeder circuit connection portion. Thus, a parasitic capacitance generated between the ground and the magnetic field coupling element by insertion of the magnetic field coupling element is able to be reduced or prevented, and a change from a matching state in which the magnetic field coupling element is not mounted is able to be reduced or prevented. In addition, the resonant frequency on the parasitic resonant circuit side is able to be increased, and a desired communication band or communication characteristic is able to be obtained.

The antenna device may include a second magnetic field coupling element including a third coil and a fourth coil, the third coil being connected between the first coil and the feeder circuit, the fourth coil being coupled to the third coil; and a second parasitic resonant circuit connected to the fourth coil. Thus, the number of resonances to be added is able to be increased, and a bandwidth is broadened, and accordingly, a domain in which communication is possible is broadened. If the resonant frequency is the same, the impedance matching is improved.

The antenna device may include a second magnetic field coupling element including a third coil and a fourth coil, the third coil being connected between the second coil and the parasitic resonant circuit, the fourth coil being coupled to the third coil; and a second parasitic resonant circuit connected to the fourth coil. With this structure, a plurality of parasitic resonant circuits are able to be used, and a communication characteristic is improved.

The antenna device may include a switch connected between the parasitic resonant circuit and the ground. This changes a resonant frequency added by providing the magnetic field coupling element and the parasitic resonant circuit and changes matching so as to improve impedance matching. In addition, the resonant frequency is able to be changed or matching is able to be changed such that the magnetic field coupling element and the parasitic resonant circuit are easily coupled to each other, thus improving impedance matching.

In a case in which the magnetic field coupling element includes a parasitic capacitance, the antenna device preferably includes an inductor that is connected to the magnetic field coupling element and that reduces or prevents a reactance component generated in the magnetic field coupling element by parallel resonance with the parasitic capacitance. Thus, a reactance component that is added by including the magnetic field coupling element is canceled, and a change from a matching state in which the magnetic field coupling element is not mounted is able to be reduced or prevented.

An antenna device according to a preferred embodiment of the present invention includes a magnetic field coupling element according to a preferred embodiment of the present invention; a radiating element that is connected to the first end of the first coil at a first portion and is connected to the feeder circuit at a second portion; and a parasitic resonant circuit that is connected to the first end of the second coil, in which the second end of the first coil is connected to the ground, and in which the second end of the second coil is connected to the ground.

With the above configuration, the radiating element and the parasitic resonant circuit do not interfere with each other in terms of radiation, the radiating element being connected to the first coil of the magnetic field coupling element, the parasitic resonant circuit being connected to the second coil of the magnetic field coupling element, and the radiation characteristic of the radiating element is not adversely affected. In addition, a frequency characteristic of a return loss of the radiating element seen from the feeder circuit is adjusted by the resonance characteristic of the parasitic resonant circuit, and a pole is generated in a desired frequency band to broaden the band of the frequency characteristic of the antenna. Since a current intensity is particularly high in a portion that is connected to the ground, the radiating element and the parasitic resonant circuit are able to be coupled to each other via the magnetic field coupling element. In addition, the magnetic field coupling element and the parasitic resonant circuit are able to be provided with a higher degree of freedom.

Electronic equipment according to a preferred embodiment of the present invention includes the above-described antenna device; a feeder circuit that is connected to the magnetic field coupling element; and a housing in which the feeder circuit is disposed, in which a portion of the radiating element or the entire radiating element is a portion of the housing.

With the above configuration, it is not necessary to provide a conductive member or a conductor pattern that is dedicated to the radiating element, and downsizing is able to be achieved. Also in electronic equipment including a metal housing, the metal housing does not prevent the radiation of the radiating element.

According to preferred embodiments of the present invention, magnetic field coupling elements each with a small inductance component and a high coupling coefficient between the first coil and the second coil, antenna devices including the same, and electronic equipment are able to be obtained.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 10A to 10H illustrate examples of conductor patterns of a first coil or a second coil.

DETAILED DESCRIPTION OF THE PREFERRED EMBODIMENTS

First Preferred Embodiment

Figure 1:
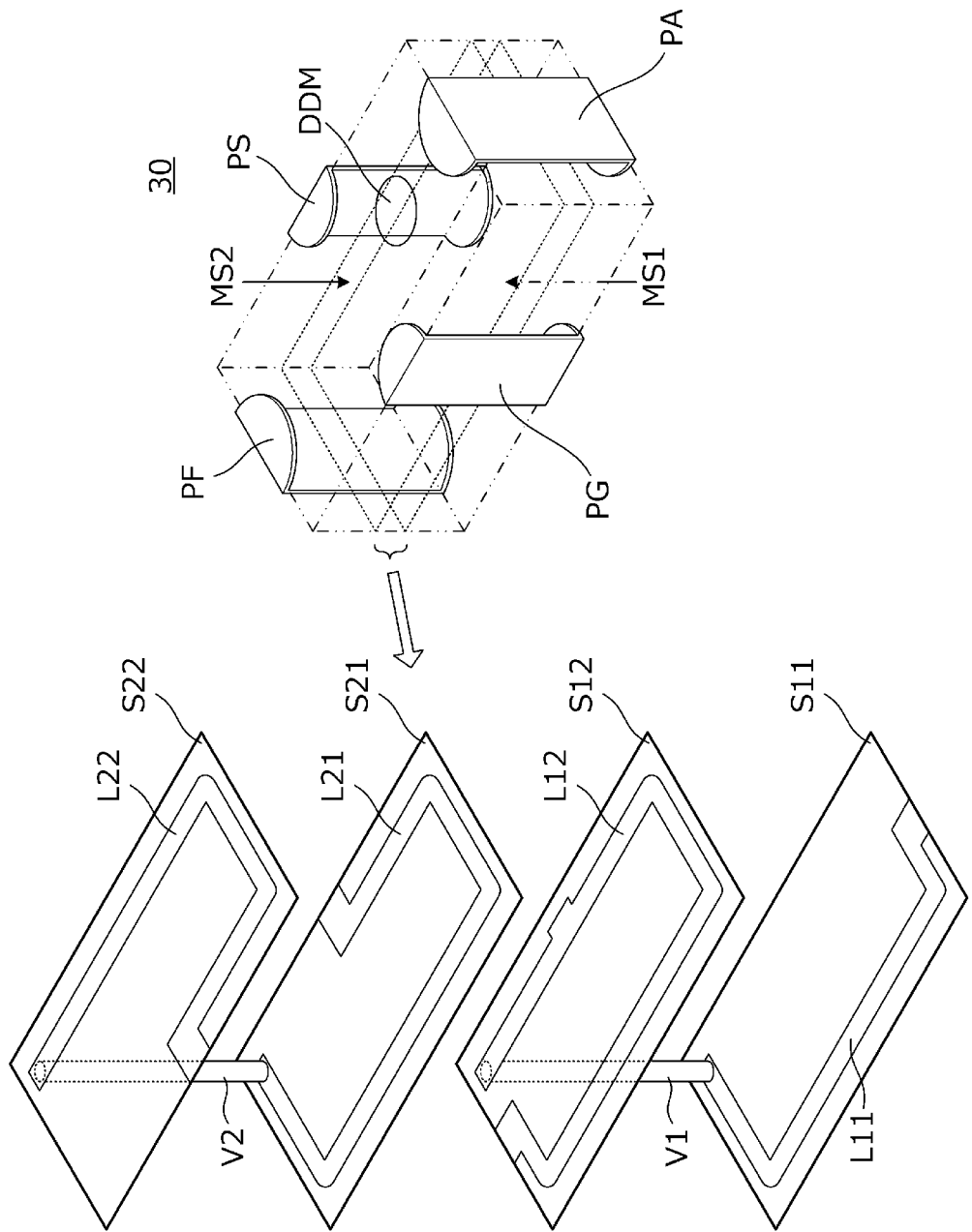
FIG. 1 is a perspective view of a coupling circuit 30 that is an example of a magnetic field coupling element according to a preferred embodiment of the present invention.
Figure 2:
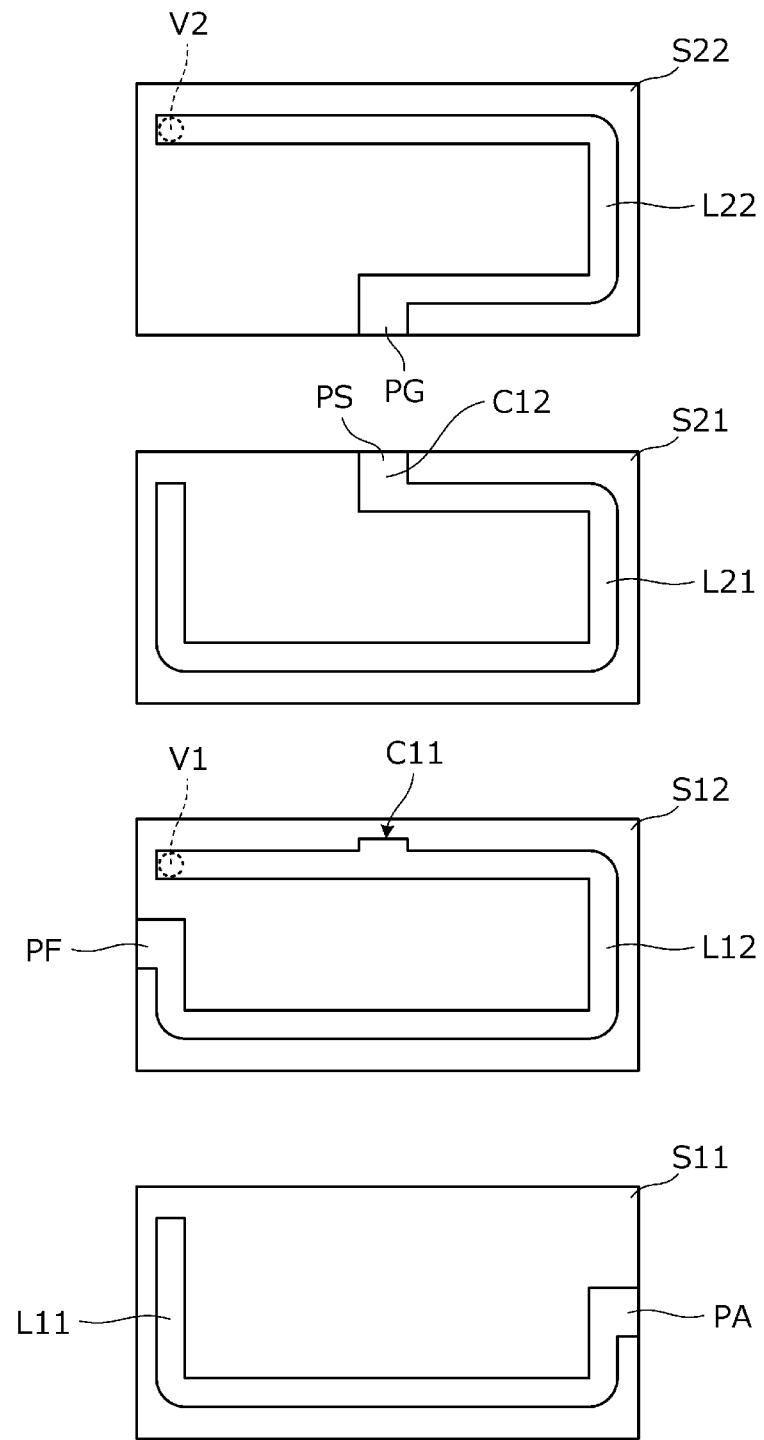
FIG. 2 is an exploded plan view illustrating conductor patterns provided on layers of the coupling circuit 30.

FIG. 1 is a perspective view of a coupling circuit 30 that is an example of the magnetic field coupling element according to a first preferred embodiment of the present invention. FIG. 2 is an exploded plan view illustrating conductor patterns provided on layers of the coupling circuit 30.

The coupling circuit 30 according to the present preferred embodiment is a rectangular or substantially rectangular parallelepiped chip component to be mounted on a circuit substrate in electronic equipment. In FIG. 1, an external structure of the coupling circuit 30 and an internal structure thereof are separately illustrated. The external structure of the coupling circuit 30 is represented by a two-dotted-and-dashed line. On an outer surface of the coupling circuit 30, a feeder circuit connection terminal PF, a radiating element connection terminal PA, a ground terminal PG, and a parasitic resonant circuit connection terminal PS are provided. In addition, the coupling circuit 30 includes a first surface MS1 and a second surface MS2 that is opposite to the first surface. In the present preferred embodiment, the first surface MS1 is a mount surface, and this surface faces a circuit substrate. On a top surface (second surface) that is opposite to the mount surface (first surface) MS1, a direction discrimination mark DDM is provided. This direction discrimination mark DDM is used to detect a direction of a chip component when, for example, the coupling circuit 30 is mounted as the chip component on a circuit substrate by a mounting machine.

Inside the coupling circuit 30, a first conductor pattern L11, a second conductor pattern L12, a third conductor pattern L21, and a fourth conductor pattern L22 are provided. The first conductor pattern L11 and the second conductor pattern L12 are connected to each other via an interlayer connection conductor V1. The third conductor pattern L21 and the fourth conductor pattern L22 are connected to each other via an interlayer connection conductor V2. Note that FIG. 1 illustrates insulating materials S11, S12, S21, and S22, on which the respective conductor patterns are provided, separately in a stacking direction. These insulating materials S11, S12, S21, and S22 may preferably be, for example, a non-magnetic ceramic multi-layer body made of LTCC (Low Temperature Co-fired Ceramics) or other suitable material or may preferably be a resin multi-layer body made of a resin material, such as polyimide or liquid crystal polymer, for example. In this manner, since the material layers are non-magnetic (not a magnetic ferrite), it is possible to use the material layers as a coupling circuit even in a high frequency band exceeding several hundreds of MHz.

Each of the conductor patterns and the interlayer connection conductors is preferably made of, for example, a conductor material including Ag or Cu as a main component and having a small resistivity. In a case in which the material layers are ceramic, for example, the conductor patterns and the interlayer connection conductors are formed by screen printing and firing of a conductive paste including Ag or Cu as a main component. In a case in which the material layers are resin, for example, the conductor patterns and the interlayer connection conductors are patterned by etching, for example, of a metal foil, such as an Al foil or a Cu foil.

The feeder circuit connection terminal PF and the radiating element connection terminal PA are terminals to which both ends of the first coil are connected, and the radiating element connection terminal PA and the ground terminal PG are terminals to which both ends of the second coil are connected. Although names of the respective terminals are names in a case of application to an antenna device described later, these names are used herein.

As illustrated in FIG. 2, the first conductor pattern L11, the second conductor pattern L12, the third conductor pattern L21, and the fourth conductor pattern L22 are respectively provided on the insulating material S11, the insulating material S12, the insulating material S21, and the insulating material S22. The insulating materials S11, S12, S21, and S22 are stacked such that the coil conductor patterns are disposed in the following order from a layer close to the mount surface: the first conductor pattern L11, the second conductor pattern L12, the third conductor pattern L21, and the fourth conductor pattern L22. Note that FIG. 2 illustrates insulating materials on which coil conductor patterns are provided. In the coupling circuit 30 according to the present preferred embodiment, an insulating material on which no coil conductor pattern is provided is stacked below the insulating material S11 and above the insulating material S22.

A first end of the first conductor pattern L11 is connected to the radiating element connection terminal PA, and a second end thereof is connected to a first end of the second conductor pattern L12 via the interlayer connection conductor V1. A second end of the second conductor pattern L12 is connected to the feeder circuit connection terminal PF. A first end of the third conductor pattern L21 is connected to the parasitic resonant circuit connection terminal PS, and a second end of the third conductor pattern L21 is connected to a first end of the fourth conductor pattern L22 via the interlayer connection conductor V2. A second end of the fourth conductor pattern L22 is connected to the ground terminal PG.

The first interlayer connection conductor V1 and the second interlayer connection conductor V2 overlap with each other in a plan view of the insulating layers. In the example illustrated in FIG. 2, the first interlayer connection conductor V1 and the second interlayer connection conductor V2 are at the same or substantially the same positions in a plan view.

In a case in which the coupling circuit 30 includes a resin multi-layer substrate, the above insulating materials S11, S12, S21, and S22 are preferably, for example, liquid crystal polymer (LCP) sheets, and the conductor patterns L11, L12, L21, and L22 are preferably, for example, obtained by patterning of a copper foil. In a case in which the coupling circuit 30 includes a ceramic multi-layer substrate, the insulating materials S11, S12, S21, and S22 are preferably, for example, LTCC, and the conductor patterns L11, L12, L21, and L22 are preferably, for example, obtained by printing of a copper paste.

Figure 3:
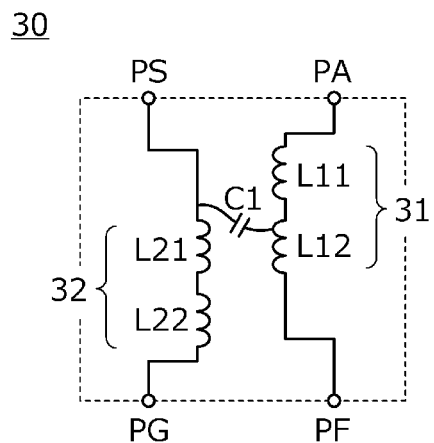
FIG. 3 is a circuit diagram of the coupling circuit 30.

FIG. 3 is a circuit diagram of the coupling circuit 30 including the four coil conductor patterns described above. The second conductor pattern L12 and the first conductor pattern L11 are connected in series to define a first coil 31. Likewise, the fourth conductor pattern L22 and the third conductor pattern L21 are connected in series to define a second coil 32. The second conductor pattern L12 and the third conductor pattern L21 are adjacent to each other in the stacking direction, and magnetic field coupling between the second conductor pattern L12 and the third conductor pattern L21 is particularly strong. Therefore, the second conductor pattern L12 and the third conductor pattern L21 are illustrated side by side in FIG. 3. The second conductor pattern L12 and the first conductor pattern L11 are magnetically coupled with the fourth conductor pattern L22 and the third conductor pattern L21. Note that the right side and the left side in FIG. 3 are referred to as primary and secondary, respectively, in order to correspond to the configuration of the coupling circuit 30 in electronic equipment described later.

With the above configuration, the respective conductor patterns L11, L12, L21, and L22 overlap with one another along the entire or substantially the entire circumference in a plan view, and the respective conductor patterns L11, L12, L21, and L22 are closest to one another in the stacking direction (adjacent to one another in the stacking direction with no other insulating materials interposed therebetween). Therefore, the coupling coefficient between the first coil and the second coil is high. In addition, the first interlayer connection conductor V1 and the second interlayer connection conductor V2 are both disposed in the stacking direction and overlap with each other in a plan view, and thus, magnetic field coupling is provided between the first interlayer connection conductor V1 and the second interlayer connection conductor V2. This increases the coupling coefficient between the first coil and the second coil. In addition, since the interlayer connection conductors V1 and V2 overlap with each other in a plan view, interference of the interlayer connection conductors with the magnetic field coupling is less than that in a structure in which a plurality of interlayer connection conductors are dispersedly disposed in a plan view as in a structure of the related art. This effect also increases the coupling coefficient between the first coil and the second coil.

In addition, a winding direction of the first coil 31 from the radiating element connection terminal PA to the feeder circuit connection terminal PF is the same as a winding direction of the second coil 32 from the parasitic resonant circuit connection terminal PS to the ground terminal PG. Furthermore, a direction of the interlayer connection conductor V1 from an end (connection point with the conductor pattern L11) to the other end (connection point with the conductor pattern L12) is the same as a direction of the interlayer connection conductor V2 from an end (connection point with the conductor pattern L21) to the other end (connection point with the conductor pattern L22). That is, a polarity of magnetic field coupling between the interlayer connection conductor V1 and the interlayer connection conductor V2 is the same as a polarity of magnetic field coupling between the conductor patterns L11 and L12 and the conductor patterns L21 and L22. Therefore, coupling between the interlayer connection conductor V1 and the interlayer connection conductor V2 increases the strength of the coupling between the first coil 31 and the second coil 32. Thus, this effect also increases the coupling coefficient between the first coil 31 and the second coil 32.

In addition, in the present preferred embodiment, the first interlayer connection conductor V1 and the second interlayer connection conductor V2 are disposed in a stacking direction with only a single insulating layer (the insulating material S21 on which the third conductor pattern L21 is provided), among a plurality of insulating layers, interposed therebetween. This makes the first interlayer connection conductor V1 and the second interlayer connection conductor V2 be closest to each other, thus improving the advantageous effect of increasing the coupling coefficient.

As illustrated in FIG. 2, preferably, for example, the first conductor pattern L11 includes about 0.5 turns, the second conductor pattern L12 includes about 1 turn, the third conductor pattern L21 includes about 0.75 turns, and the fourth conductor pattern L22 includes about 0.75 turns. That is, the first coil 31 includes about 1.5 turns, and the second coil 32 includes about 1.5 turns. In this manner, the number of turns of the first coil and the second coil is smaller than that of a common high-frequency transformer, and the primary inductance and the secondary inductance are small. Specifically, it is preferable that the number of coil windings of at least one of the first coil 31 and the second coil 32 is less than about 2 turns. Furthermore, as described above, the coupling coefficient between the first coil 31 and the second coil 32 is high (e.g., about 0.8), and thus, the leakage inductance is also small. In addition, in order to reduce or prevent leakage magnetic flux, it is preferable that each of the first coil 31 and the second coil 32 is a closed coil that is looped in a coil axis direction in a plan view, in other words, has a torus shape. That is, it is preferable that the winding includes about 1 or more turns.

FIGS. 10A to 10H illustrate examples of some conductor patterns of the first coil or the second coil. Although the conductor patterns provided on different layers overlap with one another in a plan view, FIGS. 10A to 10H illustrate the conductor patterns on the respective layers whose overlap is intentionally shifted in order to indicate the number of turns.

In a case in which the multi-layer body that defines the coupling circuit 30 is a rectangular or substantially rectangular parallelepiped and both end portions of a coil are led to one side surface of the rectangular or substantially rectangular parallelepiped, as illustrated in FIGS. 10A and 10B, it is preferable that a number of turns n of each of the first coil 31 and the second coil 32 is about 1.75<n<about 2.25, for example. FIG. 10A is an example of providing the conductor patterns on two insulating layers. If a first-layer conductor pattern includes about 1 turn and a second-layer conductor pattern includes about 0.75 turns, it is possible to lead both end portions of a coil to one side surface with about 1.75 turns. FIG. 10B is an example of providing the conductor patterns on three insulating layers. If a first-layer conductor pattern includes about 1 turn, a second-layer conductor pattern includes about 1 turn, and a third-layer conductor pattern includes about 0.25 turns, it is possible to lead both end portions of a coil to one side surface with about 2.25 turns.

In a case in which the multi-layer body that defines the coupling circuit 30 is a rectangular or substantially rectangular parallelepiped, one end portion of a coil is led to one side surface of the rectangular or substantially rectangular parallelepiped, and the other end portion of the coil is led to another side surface that is adjacent in a coil winding direction, it is preferable that the number of turns of the coil is about $1<n<$about 1.5, for example. FIG. 10C is an example of a case of providing the conductor patterns with two layers. If a first-layer conductor pattern includes about 0.75 turns and a second-layer conductor pattern includes about 0.25 turns, it is possible to lead both end portions of a coil to two side surfaces with about 1 turn. FIG. 10D is an example of a case of providing the conductor patterns with two layers. If a first-layer conductor pattern includes about 0.75 turns and a second-layer conductor pattern includes about 0.75 turns, it is possible to lead both end portions of a coil to two side surfaces with about 1.5 turns.

In a case in which the multi-layer body that defines the coupling circuit 30 has a rectangular or substantially rectangular parallelepiped shape, for example, one end portion of a coil is led to one side surface of the rectangular or substantially rectangular parallelepiped, and the other end portion of the coil is led to another side surface that is adjacent in a direction opposite to the coil winding direction, it is preferable that the number of turns of the coil is about $1.5<n<$about 2, for example. FIG. 10E is a case of providing the conductor patterns with two layers. If a first-layer conductor pattern includes about 1 turn and a second-layer conductor pattern includes about 0.5 turns, it is possible to lead both end portions of a coil to two side surfaces with about 1.5 turns. FIG. 10F is a case of providing the conductor patterns with two layers. If a first-layer conductor pattern includes about 1 turn and a second-layer conductor pattern includes about 1 turn, it is possible to lead both end portions of a coil to two side surfaces with about 2 turns.

In a case in which the multi-layer body that defines the coupling circuit 30 has a rectangular or substantially rectangular parallelepiped shape, one end portion of a coil is led to one side surface of the rectangular or substantially rectangular parallelepiped, and the other end portion of the coil is led to another side surface that surfaces the side surface, it is preferable that the number of turns of the coil is about $1.25<n<$about 1.75, for example. FIG. 10G is an example of providing the conductor patterns on two insulating layers. If a first-layer conductor pattern includes about 1 turn and a second-layer conductor pattern includes about 0.25 turns, it is possible to lead both end portions of a coil to two facing side surfaces with a small number of turns, which is about 1.25 turns. In FIG. 10H is an example of providing the conductor patterns on two insulating layers. If a first-layer conductor pattern includes about 1 turn and a second-layer conductor pattern includes about 0.75 turns, it is possible to lead both end portions of a coil to two facing side surfaces with about 1.75 turns.

In addition, the conductor patterns L11, L12, L21, and L22 that define the first coil 31 and the second coil 32 preferably fall within a range of, for example, less than about ⅓ of a stacking height of the multi-layer body that defines the coupling circuit 30 in the stacking direction. Thus, the coupling coefficient between the first coil 31 and the second coil 32 is high. That is, in the multi-layer body, although the number of coil turns may be further increased, the number of coil turns is not increased, and thus, the coupling coefficient is increased while the coil inductances are reduced or prevented. Also, with this structure, unnecessary coupling between the conductor patterns L11, L12, L21, and L22 in the multi-layer body and an electronic component or a conductor that is in the periphery is reduced or prevented.

In a case in which there is another pattern that is connected to none of the first coil 31 and the second coil 32, such as a capacitor pattern, inside the multi-layer body, the configuration is as follows. First, in a case in which the first coil 31 and the second coil 32 are provided in a region between another pattern and the top surface or mount surface of the multi-layer body, it is preferable that the first coil 31 and the second coil 32 fall within a range of, for example, less than about ⅓ of a stacking height of the region. In addition, in a case in which there are two "other patterns" and the first coil 31 and the second coil 32 are provided in a region between the two other patterns, it is preferable that the first coil 31 and the second coil 32 fall within a range of, for example, less than about ⅓ of the stacking height of the region between the two "other patterns". This reduces or prevents unnecessary coupling with an electronic component or a conductor that is in the periphery or the other conductor patterns in the multi-layer body.

The number of turns of the first conductor pattern L11 and the fourth conductor pattern L22 is smaller than that of the second conductor pattern L12 and the third conductor pattern L21. That is, a conductor pattern length of a coil conductor pattern that is closer to an outer layer than to an inner layer is relatively small. This decreases a facing area between the electronic component or the conductor that is in the periphery and the coupling circuit 30, thus reducing or preventing unnecessary coupling.

According to the present preferred embodiment, a magnetic field coupling element with a small inductance component and a high coupling coefficient between the first coil and the second coil is able to be obtained.

In the example illustrated in FIG. 2, a capacitance formation conductor pattern C11 is provided in a portion of the second conductor pattern L12, and a capacitance formation conductor pattern C12 is provided in a portion of the third conductor pattern L21.

Accordingly, as illustrated in FIG. 3, a capacitance C1 is provided between a middle portion of the second conductor pattern L12 and the parasitic resonant circuit connection terminal PS. The capacitance C1 defines and functions as an impedance matching circuit of a high-frequency circuit to be connected to the coupling circuit 30.

The capacitance formation conductor pattern C11 protrudes from the second conductor pattern L12 toward outside of a winding range of the second conductor pattern L12. In addition, the capacitance formation conductor pattern C12 protrudes from the third conductor pattern L21 toward outside of a winding range of the third conductor pattern L21. In this manner, while the capacitance formation conductor patterns are included, the conductor patterns L11, L12, L21, and L22 for coil formation overlap with one another along the entire or substantially the entire circumference in a plan view. Accordingly, the capacitance formation conductor patterns do not interfere with magnetic flux that passes through coil openings, and the high coupling coefficient between the first coil and the second coil is able to be maintained.

In addition, since the capacitance formation conductor patterns C11 and C12 are defined by portions of the conductor patterns for coil formation, unnecessary coupling between these capacitance formation conductor patterns and an electronic component or a conductor that is in the periphery is reduced or prevented.

In addition, the capacitance formation conductor pattern C12 is also a portion of a leading conductor pattern that extends to the parasitic resonant circuit connection terminal PS, which is an end portion of the insulating material S21. In this manner, by using one of the capacitance formation conductor patterns as the leading conductor pattern that is originally necessary, the coupling circuit 30 is able to be downsized accordingly.

Figure 4:
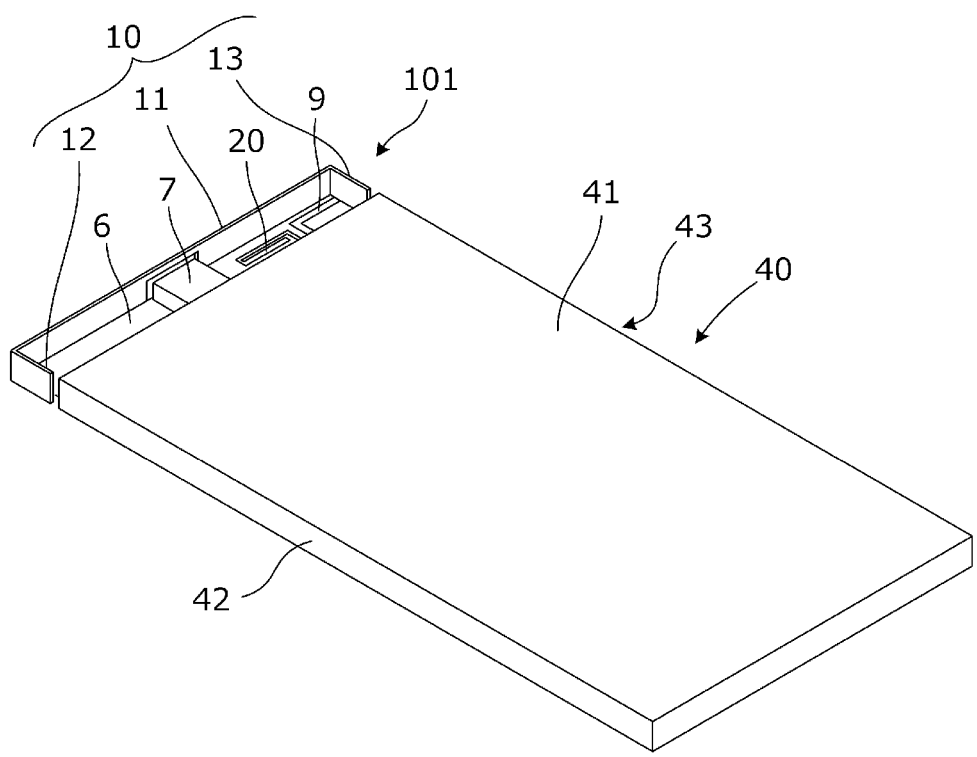
FIG. 4 is a perspective view illustrating a main configuration of an antenna device 101 according to a first preferred embodiment of the present invention and electronic equipment including the same.
Figure 5:
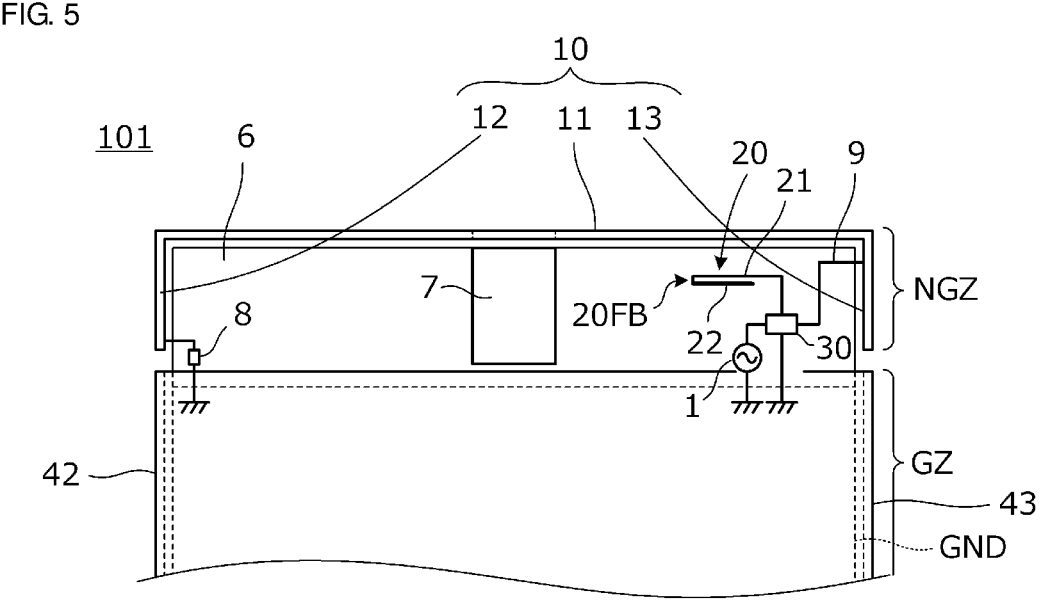
FIG. 5 is a plan view of a main portion of the antenna device 101.

Next, an antenna device including the coupling circuit and electronic equipment will be described. FIG. 4 is a perspective view illustrating a main configuration of an antenna device 101 and electronic equipment including the same. FIG. 5 is a plan view of a main portion of the antenna device 101.

A metal housing of the electronic equipment includes a radiating element 10, which is an end portion of the metal housing, and a metal housing main portion 40. The metal housing main portion 40 includes a plane portion 41 and side surface portions 42 and 43.

The antenna device 101 includes the radiating element 10, a parasitic resonant circuit 20, and the coupling circuit 30.

The radiating element 10 is the end portion of the metal housing, and includes an end surface portion 11 and side surface portions 12 and 13. An end portion of the side surface portion 12 is connected to a ground (is grounded) of a circuit substrate 6 via an inductor 8. Although an end portion of the side surface portion 13 is open, a parasitic capacitance C is generated between this open end and the ground. Note that a connector 7, such as a USB, is mounted on the circuit substrate 6, and an opening for the connector 7 is provided in the end surface portion 11. However, the connector 7 is not a component of the antenna device 101.

The circuit substrate 6 includes a ground region GZ in which a ground electrode GND is provided and a non-ground region NGZ in which a ground electrode is not provided. The end portion of the metal housing, which is the radiating element 10, is located on the non-ground region side. In the non-ground region NGZ of the circuit substrate 6, the parasitic resonant circuit 20 is provided using a conductor pattern. Also in the non-ground region NGZ of the circuit substrate 6, a feeding line 9 that connects the coupling circuit 30 and the radiating element 10 to each other is provided.

As illustrated in FIG. 5, the parasitic resonant circuit includes a linear conductor pattern including a returning portion 20FB in the middle. In this manner, since the linear conductor pattern including a returning portion in the middle is provided, the parasitic resonant circuit 20 is provided in a small area. In addition, in the present preferred embodiment, a first linear conductor pattern portion 21 extending from the coupling circuit 30 and a second linear conductor pattern portion 22 that returns to a side away from the radiating element 10 are included. With this structure, since a portion close to the radiating element (the end surface portion 11 in particular) is short, and extending directions are opposite to each other, substantial coupling with the radiating element 10 (the end surface portion 11 in particular) is weak. This reduces or prevents unnecessary coupling between the parasitic resonant circuit 20 and the radiating element 10.

Note that the second linear conductor pattern portion 22 is wider than the first linear conductor pattern portion 21. Thus, a resonant bandwidth is able to be broadened.

Figure 6:
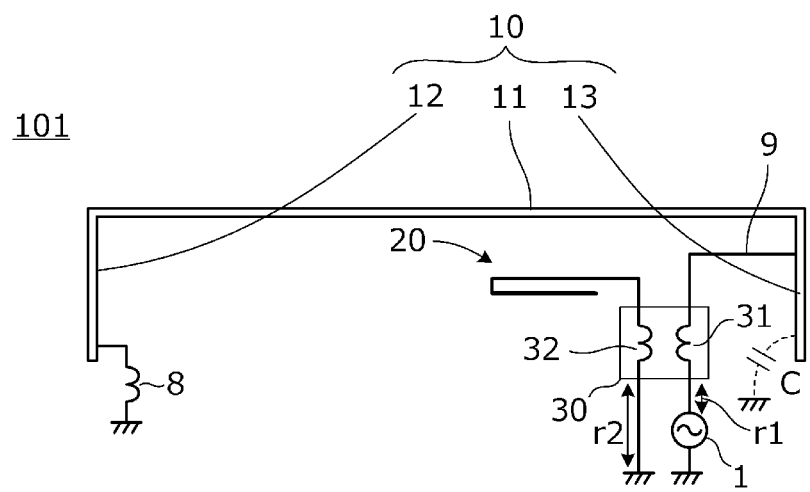
FIG. 6 illustrates a configuration of the coupling circuit 30 and a circuit connected thereto.

FIG. 6 illustrates a configuration of the coupling circuit 30 and a circuit connected thereto. The coupling circuit includes the first coil 31 and the second coil 32, and a transformer is defined by the first coil 31 and the second coil 32. The first coil 31 and the second coil 32 have small inductances, each of which is preferably, for example, about 10 nH or less. The radiating element 10 and the parasitic resonant circuit 20 are coupled to each other via the coupling circuit 30 with a coupling coefficient of about 0.5 or more, preferably a coupling coefficient of, for example, about 0.8 or more. As the inductance of a coupling element is smaller, influence on a circuit characteristic and a radiation characteristic of the radiating element 10 is able to be more effectively reduced or prevented. As the coupling coefficient is higher, the radiating element 10 and the parasitic resonant circuit 20 are able to be more electrically connected to each other, and a resonance point is able to be added to only a frequency at which the parasitic resonant circuit 20 more largely contributes to resonance. In this manner, by configuring a transformer in which electromagnetic field coupling is provided between the first coil 31 and the second coil 32, a coupling circuit with a high coupling coefficient between the first coil 31 and the second coil 32 is provided, and a resonance characteristic of the parasitic resonant circuit 20 when seeing the radiating element 10 from a feeder circuit 1 is likely to be shown.

The first coil 31 is connected between the radiating element 10 and the feeder circuit 1. A first end of the second coil 32 is connected to the parasitic resonant circuit 20, and a second end thereof is connected to the ground (is grounded) of the circuit substrate 6.

With the electronic equipment according to the present preferred embodiment, the metal portion of the housing that accommodates the feeder circuit is used as the radiating element, and thus, it is unnecessary to provide a conductive member or a conductor pattern dedicated to the radiating element, thus achieving downsizing. In addition, also in electronic equipment including a metal housing, the metal housing does not block electromagnetic waves.

Figure 7A:
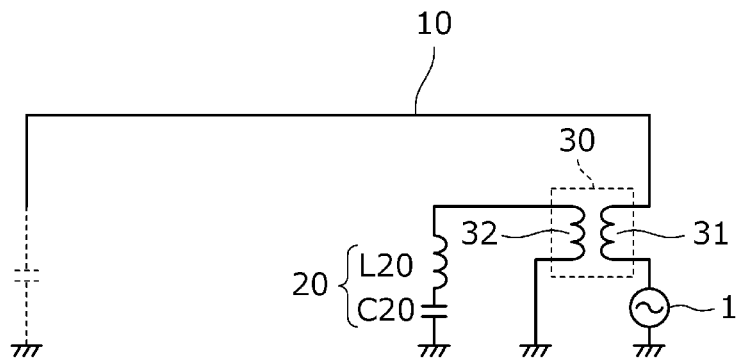
FIG. 7A is an equivalent circuit diagram of the antenna device 101 in a high band.

FIG. 7A is an equivalent circuit diagram of the antenna device 101 in a high band. In a high band (e.g., about 1.6 GHz to about 2.3 GHz), the inductor 8 (see FIG. 5 and FIG. 6) has a predetermined high impedance, and a tip of the radiating element 10 is equivalently open. In this state, the radiating element 10 defines and functions as a monopole antenna that resonates at about $3/4$ wavelengths or about $(2n+1)/4$ wavelengths (n is a natural number).

Figure 7B:
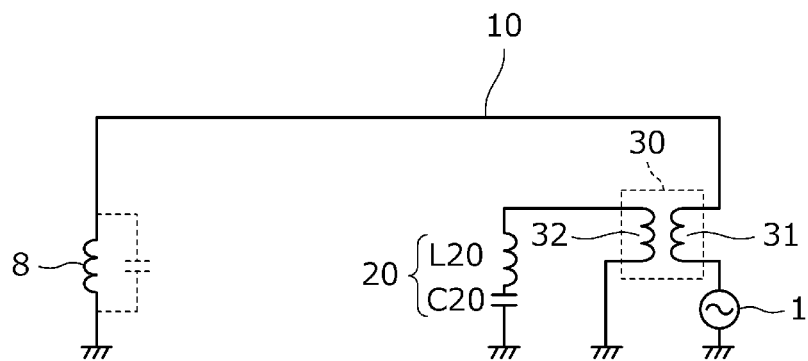
FIG. 7B is an equivalent circuit diagram of the antenna device 101 in a low band.

FIG. 7B is an equivalent circuit diagram of the antenna device 101 in a low band. In a low band (e.g., about 700 MHz to about 900 MHz), the inductor 8 has a predetermined inductance, and the tip of the radiating element 10 is grounded via the inductor 8. In this state, the radiating element 10 defines and functions as a loop antenna of one wavelength or its integer multiple.

A series circuit including an inductor L20 and a capacitor C20 illustrated in FIGS. 7A and 7B is an element for representing an equivalent circuit in which the parasitic resonant circuit 20 is simply illustrated as a lumped constant circuit. The parasitic resonant circuit 20 defines and functions as an open stub that resonates at a predetermined frequency at about $3/4$ wavelengths or about $(2n+1)/4$ wavelengths (n is a natural number). Thus, the capacitor C20 is used for representation in FIGS. 7A and 7B. The parasitic resonant circuit 20 resonates preferably in, for example, a frequency band whose center is about 2.1 GHz. Note that in the present preferred embodiment, since the parasitic resonant circuit 20 has a shape in which the linear conductor pattern is returned in the middle, an obvious standing wave is not provided in the linear conductor pattern compared with a simple straight line conductor pattern, and a Q value of resonance as a resonance circuit is relatively small.

Figure 8:
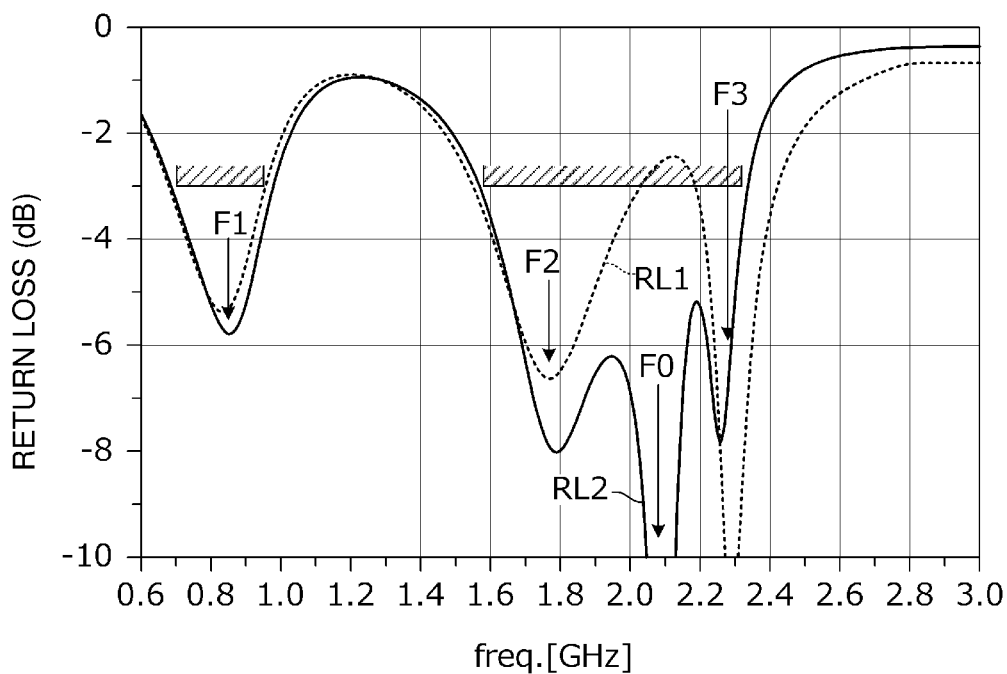
FIG. 8 illustrates a frequency characteristic of a return loss of the antenna device 101 and an antenna device of a comparative example.

FIG. 8 illustrates a frequency characteristic of a return loss of the antenna device 101 and an antenna device of a comparative example. In FIG. 8, a return loss characteristic RL1 is a return loss of the antenna device 101 according to the present preferred embodiment, and a return loss characteristic RL2 is a return loss of the antenna device according to the comparative example. The antenna device according to the comparative example is an antenna device in which the coupling circuit 30 and the parasitic resonant circuit 20 are not included. In either antenna device, a pole is generated at a center frequency F1 of a low band (about 700 MHz to about 900 MHz). This is due to the resonance characteristic of the loop antenna illustrated in FIG. 7B. Another pole is generated at a frequency F2 (around 1.75 GHz). This is due to ¾ wavelength resonance of the monopole antenna illustrated in FIG. 7A. Still another pole is generated at a frequency F3 (around 2.3 GHz). This is due to 5/4 wavelength resonance of the monopole antenna illustrated in FIG. 7A.

Note that it is preferable that a length "r1" of a line between the first coil 31 and the feeder circuit 1 illustrated in FIG. 6 and a length "r2" of a line between an end portion of the second coil 32 and the ground is, for example, less than about ⅛ wavelength of the resonant frequency. The wavelength here may mean an effective wavelength considering a wavelength shortening effect of a magnetic body or a dielectric. The threshold is set to "about ⅛ wavelength" because it is practical until a condition where a ⅛ wavelength current becomes 1/√2, in other words, a power that is able to be transmitted is halved, is satisfied.

Figure 9:
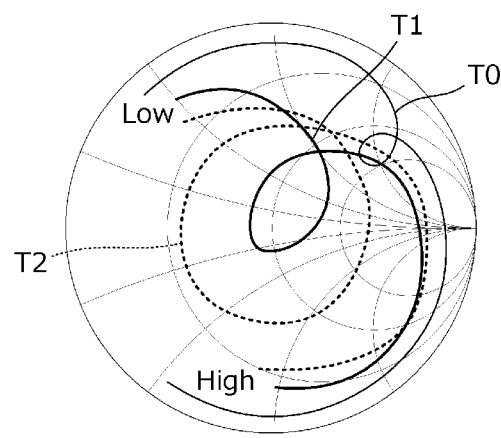
FIG. 9 is a conceptual diagram illustrating a difference in impedance matching depending on the strength of coupling of the coupling circuit.

Here, FIG. 9 illustrates a conceptual diagram of a difference in impedance matching depending on the strength of the coupling. In FIG. 9, loci T0, T1, and T2 are impedance loci representing, on a Smith chart, impedances when seeing the antenna device 101 from the feeder circuit 1. Locus T0 is a characteristic in a state in which the coupling circuit 30 and the parasitic resonant circuit 20 are not provided, locus T1 is a characteristic in a state in which the first coil 31 and the second coil 32 of the coupling circuit 30 are appropriately coupled to each other, and locus T2 is a characteristic in a state in which the coupling between the first coil 31 and the second coil 32 of the coupling circuit 30 is too strong.

In this manner, when the coupling between the first coil 31 and the second coil 32 of the coupling circuit 30 is too strong, the impedance seen from the feeder circuit deviates from the impedance (e.g., about 50Ω) on the feeder circuit (and transmission line) side. Therefore, it is important that the first coil 31 and the second coil 32 of the coupling circuit 30 are appropriately coupled to each other. The length "r1" of the line between the first coil 31 and the feeder circuit 1 and the length "r2" of the line between the end portion of the second coil 32 and the ground are set within a range of less than about ⅛ wavelength of the resonant frequency, and thus, the coupling by the coupling circuit 30 is able to be appropriately set.

In the antenna device 101 according to the present preferred embodiment, another pole is generated at a frequency F0 (around 2.1 GHz). This is due to a resonance characteristic of the parasitic resonant circuit 20. That is, since the parasitic resonant circuit 20 resonates in a frequency band whose center frequency is about 2.1 GHz, the pole is generated at about 2.1 GHz in the frequency characteristic of a return loss of the antenna device 101 seen from the feeder circuit 1. With the antenna device 101 according to the present preferred embodiment, a high-band application frequency band is broadened from about 1.6 GHz to about 2.3 GHz, for example.

In the low band, the parasitic resonant circuit 20 does not resonate, and the return loss characteristic in the low band is not influenced. That is, the parasitic resonant circuit 20 influences the return loss characteristic seen from the feeder circuit 1 in, for example, a frequency band of about 1.6 GHz or higher, and the parasitic resonant circuit 20 has substantially no influence in a frequency band lower than that.

As described above, since the inductance component of the coupling circuit 30 is small, even if the coupling circuit 30 is inserted into an antenna circuit, a radiation characteristic of the radiating element is unlikely to be influenced. In addition, since the coupling coefficient between the first coil and the second coil of the coupling circuit 30 is high, the resonance characteristic of the parasitic resonant circuit 20 when seeing the radiating element 10 from the feeder circuit 1 is likely to be shown. Thus, a new deep resonance point is added, and a frequency band at which the radiating element and the feeder circuit are matched is broadened.

The return loss characteristic at around the frequency F0 is determined by the resonance characteristic of the parasitic resonant circuit 20, and accordingly, the return loss characteristic at about the frequency F0 is able to be determined as appropriate by the shape of the conductor pattern that defines the parasitic resonant circuit 20. In the present preferred embodiment, since the parasitic resonant circuit 20 is defined by the linear conductor pattern that includes a returning portion in the middle, sharpness of resonance of the parasitic resonant circuit 20 is degraded, and the parasitic resonant circuit 20 is able to attenuate a reflection coefficient in a wide band including the band in which the pole generated at the frequency F0 and its periphery.

Note that the parasitic resonant circuit 20 that defines and functions as an open stub is substantially provided independently of the radiating element 10, and thus, for example, there is no influence on the low band compared with a case in which a stub is provided in the radiating element.

In addition, a winding direction of the first coil 31 from the feeder circuit connection terminal PF to the radiating element connection terminal PA and a winding direction of the second coil 32 from the parasitic resonant circuit connection terminal PS to the ground terminal PG are opposite to each other. That is, a magnetic field (magnetic flux) generated when current flows in the first coil 31 in a direction from the feeder circuit connection terminal PF to the radiating element connection terminal PA and a magnetic field (magnetic flux) generated when current flows in the second coil 32 in a direction from the parasitic resonant circuit connection terminal PS to the ground terminal PG weaken each other. Here, when the radiating element connection terminal PA resonates as a monopole antenna, in the coupling circuit 30, polarities of the first coil 31 and the second coil 32, which are connected to each other via the feeder circuit 1 and the ground electrode GND, become opposite to each other. Current flows in the first coil 31 from the feeder circuit connection terminal PF to the radiating element connection terminal PA, and current flows in the second coil 32 from the parasitic resonant circuit connection terminal PS to the ground terminal PG. The generated magnetic fields (magnetic fluxes) weaken each other. Thus, the inductances of the first coil 31 and the second coil 32 are reduced by a mutual inductance due to coupling between the first coil 31 and the second coil 32, and influences on the circuit characteristic and the radiation characteristic of the radiating element 10 are small.

In addition, the coupling circuit 30 includes the capacitance C1, and the capacitance C1 defines and functions as an impedance matching circuit between the feeder circuit connected to the feeder circuit connection terminal PF and the parasitic resonant circuit connected to the parasitic resonant circuit connection terminal PS.

In addition, the parasitic resonant circuit 20 may resonate in a high band to contribute as a radiating element. Furthermore, the parasitic resonant circuit 20 may resonate in a high band together with the radiating element 10 and the metal housing main portion 40 to contribute as a radiating element.

Second Preferred Embodiment

Figure 11:
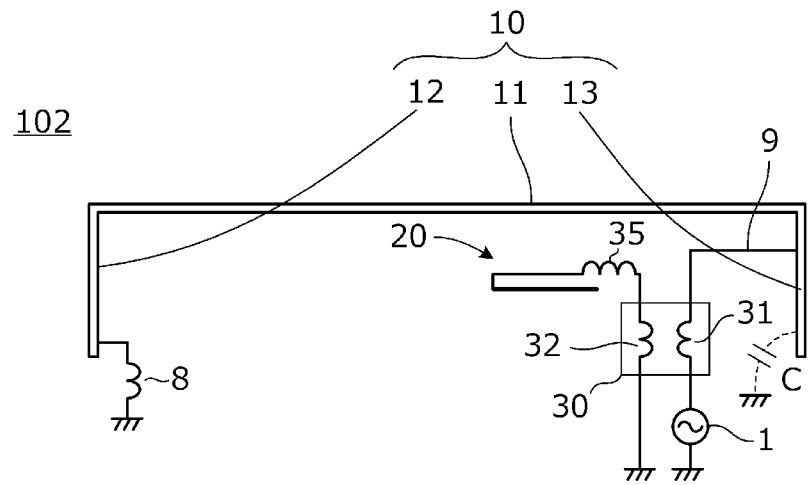
FIG. 11 illustrates a circuit configuration of an antenna device 102 according to a second preferred embodiment of the present invention.

FIG. 11 illustrates a circuit configuration of an antenna device 102 according to a second preferred embodiment of the present invention. In the antenna device 102, an inductor 35 is connected (inserted) between the second coil 32 of the coupling circuit 30 and the parasitic resonant circuit 20. The remaining configuration is the same or substantially the same as that of the circuit illustrated in FIG. 6 in the first preferred embodiment.

According to the present preferred embodiment, the inductor 35 is provided at a portion at which current is low. Thus, while a change in the coupling of the coupling circuit 30 is reduced or prevented, the resonant frequency of the parasitic resonant circuit 20 is able to be decreased, and a desired communication band is able to be obtained. Alternatively, while the resonant frequency is maintained, the length of the parasitic resonant circuit 20 is able to be reduced, and the area used is reduced.

Note that the inductor 35 may also be integrated with the coupling circuit 30. However, it is preferable that the inductor 35 is not coupled to the first coil 31.

Third Preferred Embodiment

Figure 12:
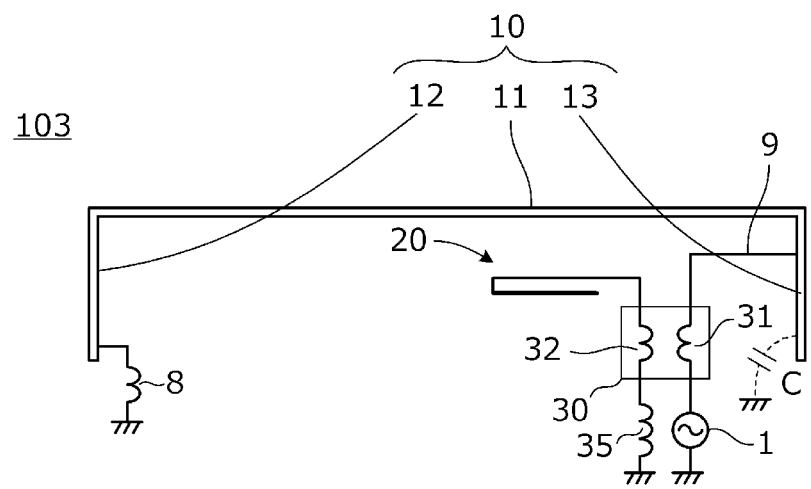
FIG. 12 illustrates a circuit configuration of an antenna device 103 according to a third preferred embodiment of the present invention.

FIG. 12 illustrates a circuit configuration of an antenna device 103 according to a third preferred embodiment of the present invention. In the antenna device 103, the inductor 35 is connected (inserted) between the second coil 32 of the coupling circuit 30 and the ground. The remaining configuration is the same or substantially the same as that of the circuit illustrated in FIG. 6 in the first preferred embodiment.

When the coupling circuit 30 is added to the antenna device, a parasitic capacitance is generated between the ground and the coupling circuit 30. According to the present preferred embodiment, resonance between the inductor 35 and the parasitic capacitance is able to reduce or prevent a reactance component. Therefore, in a frequency band in which an antenna characteristic is not desired to be changed by the addition of the coupling circuit 30 to the antenna device, by including the inductor 35 with such an inductance as to resonate with the parasitic capacitance, a change from a matching state at which the coupling circuit 30 is not mounted is able to be reduced or prevented.

In addition, the inclusion of the inductor 35 decreases the resonant frequency of the parasitic resonant circuit 20, and a desired communication band or communication characteristic is able to be obtained. Alternatively, while the resonant frequency is maintained, the length of the antenna is able to be reduced, and the area used is able to be reduced.

Note that the inductor 35 may also be integrated with the coupling circuit 30. However, it is preferable that the inductor 35 is not coupled to the first coil 31.

Fourth Preferred Embodiment

Figure 13:
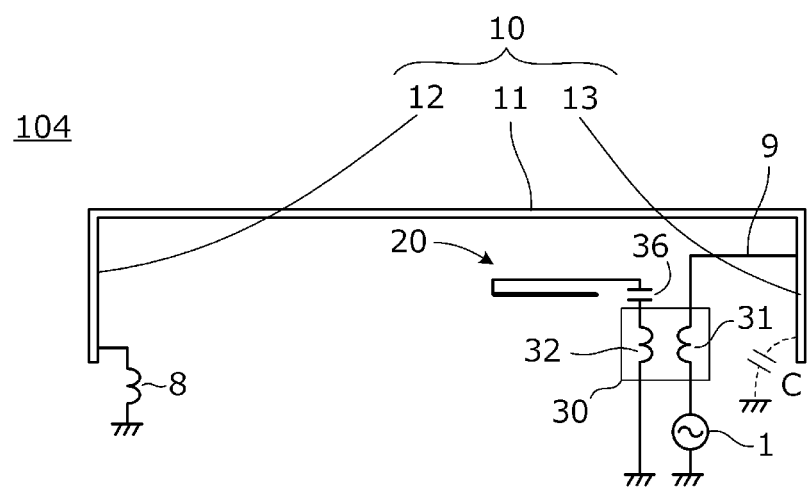
FIG. 13 illustrates a circuit configuration of an antenna device 104 according to a fourth preferred embodiment of the present invention.

FIG. 13 illustrates a circuit configuration of an antenna device 104 according to a fourth preferred embodiment of the present invention. In the antenna device 104, a capacitor 36 is connected (inserted) between the second coil 32 of the coupling circuit 30 and the parasitic resonant circuit 20. The remaining configuration is the same or substantially the same as that of the circuit illustrated in FIG. 6 in the first preferred embodiment.

According to the present preferred embodiment, the resonant frequency on the parasitic resonant circuit side is able to be increased, and a desired communication band is able to be obtained.

Note that the above capacitor 36 may be integrated with the coupling circuit 30.

Fifth Preferred Embodiment

Figure 14:
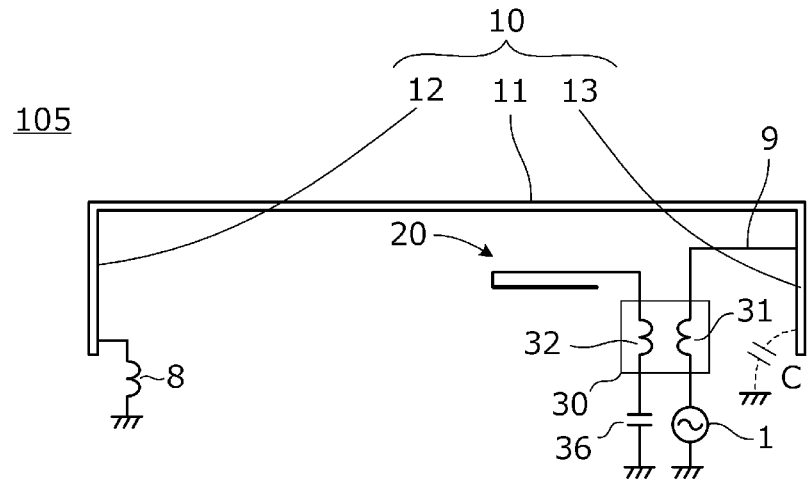
FIG. 14 illustrates a circuit configuration of an antenna device 105 according to a fifth preferred embodiment of the present invention.

FIG. 14 illustrates a circuit configuration of an antenna device 105 according to a fifth preferred embodiment of the present invention. In the antenna device 105, the capacitor is connected (inserted) between the second coil 32 of the coupling circuit 30 and the ground. The remaining configuration is the same or substantially the same as that of the circuit illustrated in FIG. 6 in the first preferred embodiment.

According to the present preferred embodiment, a parasitic capacitance generated between the ground and the coupling circuit 30 by including the coupling circuit 30 is able to be reduced (combined capacitance is able to be reduced), and a change from a matching state in which the coupling circuit 30 is not mounted is able to be reduced or prevented. In addition, the resonant frequency of the parasitic resonant circuit 20 is able to be increased, and a desired communication band or communication characteristic is able to be obtained.

Note that the capacitor 36 may be integrated with the coupling circuit 30.

Sixth Preferred Embodiment

Figure 15:
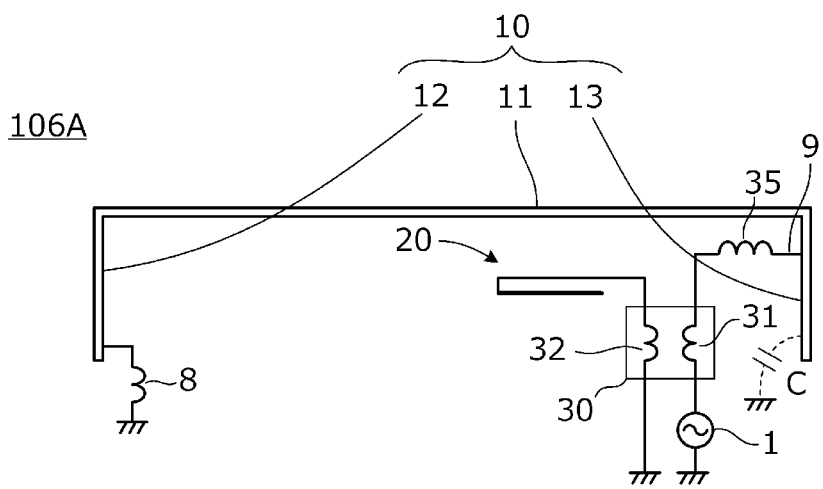
FIG. 15 illustrates a circuit configuration of an antenna device 106A according to a sixth preferred embodiment of the present invention.

FIG. 15 illustrates a circuit configuration of an antenna device 106A according to a sixth preferred embodiment of the present invention. In the antenna device 106A, the inductor is connected (inserted) between the first coil 31 of the coupling circuit 30 and the radiating element 10. The remaining configuration is the same or substantially the same as that of the circuit illustrated in FIG. 6 in the first preferred embodiment.

With the configuration of the antenna device 106A, since the first coil 31 is closer to the feeder circuit 1, at which the current is strong, than the inserted inductor 35 is, while a power ratio to be supplied to the parasitic resonant circuit 20 is maintained, the resonant frequency of the radiating element 10 is able to be changed, and a level of impedance matching is able to be adjusted. In addition, a self-resonant frequency that is determined by the inductances of the first coil 31 and the second coil 32 and the parasitic capacitance generated between the first coil 31 and the second coil 32 is unlikely to be decreased, and thus, the self-resonant frequency does not adversely affect the use in a communication frequency band. That is, in a state of self-resonance, energy in the frequency band falls to the ground and is not radiated. However, in a state in which the self-resonant frequency is higher than the communication frequency band, such a problem does not arise.

Figure 16:
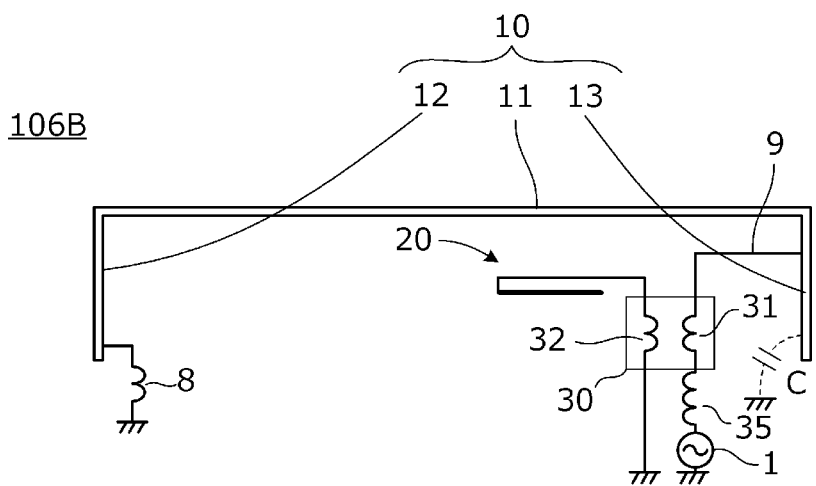
FIG. 16 illustrates a circuit configuration of an antenna device 106B according to the sixth preferred embodiment of the present invention.

FIG. 16 illustrates a circuit configuration of an antenna device 106B according to the sixth preferred embodiment. In the antenna device 106B, the inductor 35 is connected (inserted) between the first coil 31 of the coupling circuit 30 and the feeder circuit 1. The remaining configuration is the same or substantially the same as that of the circuit illustrated in FIG. 6 in the first preferred embodiment.

With the configuration of the antenna device 106B, since the first coil 31 of the coupling circuit 30 is disposed at a side at which current is weaker than that at the position of the inductor 35, compared with a case in which the inductor is inserted between the radiating element 10 and the first coil 31, it is possible to adjust the level of impedance matching as appropriate in resonance (resonant frequency) added by the coupling circuit 30 and the parasitic resonant circuit 20. Specifically, it is possible to avoid a situation in which an input impedance excessively changes and the impedance is no longer matched.

In addition, the insertion of the inductor 35 decreases the self-resonant frequency of the coupling circuit 30, and thus, by setting the self-resonant frequency to a frequency band that is not desired to be radiated, unnecessary radiation is able to be reduced or prevented.

Figure 17:
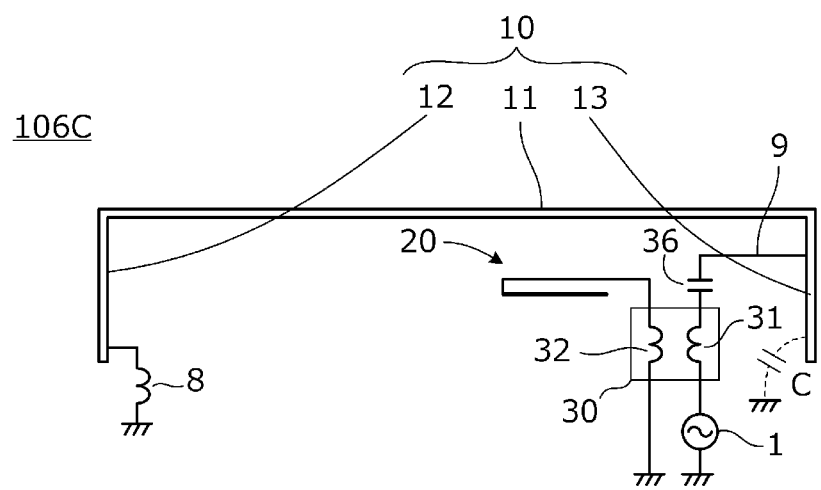
FIG. 17 illustrates a circuit configuration of an antenna device 106C according to the sixth preferred embodiment of the present invention.

FIG. 17 illustrates a circuit configuration of an antenna device 106C according to the sixth preferred embodiment. In the antenna device 106C, the capacitor 36 is connected (inserted) between the first coil 31 of the coupling circuit 30 and the radiating element 10. The remaining configuration is the same or substantially the same as that of the circuit illustrated in FIG. 6 in the first preferred embodiment.

With the configuration of the antenna device 106C, by the capacitance of the inserted capacitor 36, the resonant frequency of the radiating element 10 is able to be adjusted, and the level of impedance matching is able to be adjusted.

Figure 18:
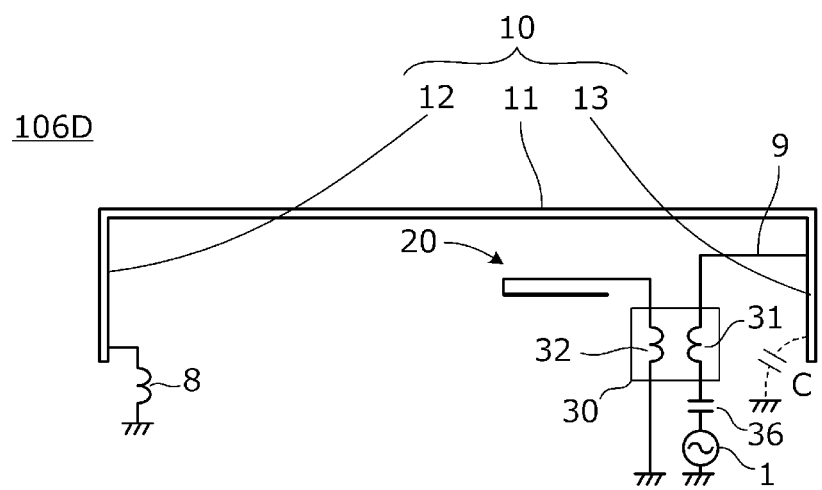
FIG. 18 illustrates a circuit configuration of an antenna device 106D according to the sixth preferred embodiment of the present invention.

FIG. 18 illustrates a circuit configuration of an antenna device 106D according to the sixth preferred embodiment. In the antenna device 106D, the capacitor 36 is connected (inserted) between the first coil 31 of the coupling circuit 30 and the feeder circuit 1. The remaining configuration is the same or substantially the same as that of the circuit illustrated in FIG. 6 in the first preferred embodiment.

With the configuration of the antenna device 106D, by the capacitance of the inserted capacitor 36, the resonant frequency of the radiating element 10 is able to be adjusted, and the level of impedance matching is able to be adjusted. In addition, since the capacitor 36 is disposed between the feeder circuit 1 and the first coil 31, a parasitic capacitance generated between the first coil 31 and the second coil 32 and the capacitor are connected in series in the structure. Accordingly, a combined capacitance included in a self-resonant circuit system is decreased, and the self-resonant frequency is increased. Thus, the self-resonant frequency is able to be excluded from the communication band to be used.

Seventh Preferred Embodiment

Figure 19A:
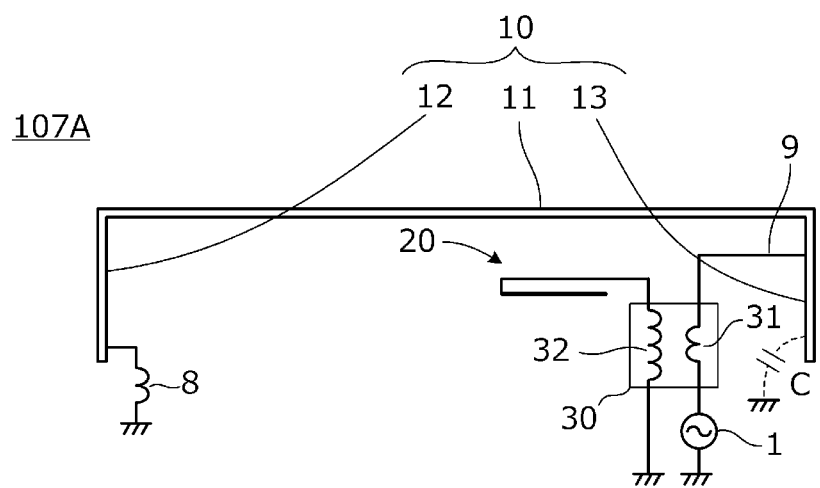
FIG. 19A illustrates a circuit configuration of an antenna device 107A according to a seventh preferred embodiment.
Figure 19B:
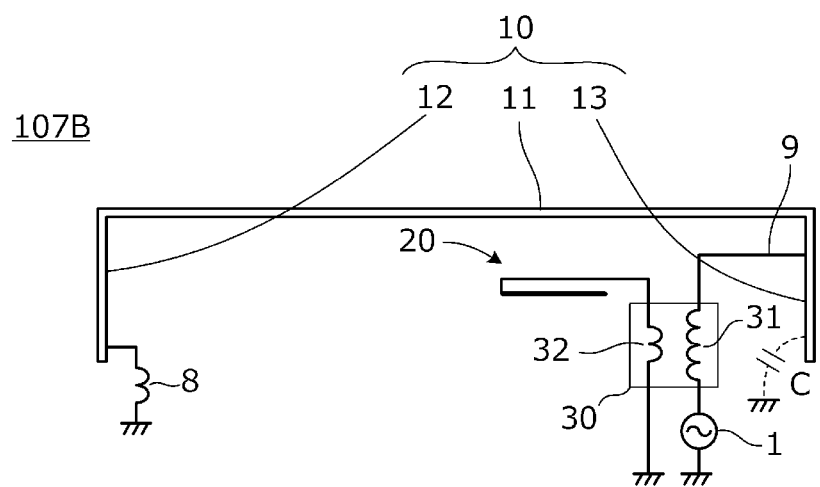
FIG. 19B illustrates a circuit configuration of an antenna device 107B according to the seventh preferred embodiment of the present invention.

FIG. 19A illustrates a circuit configuration of an antenna device 107A according to a seventh preferred embodiment of the present invention, and FIG. 19B illustrates a circuit configuration of an antenna device 107B according to the seventh preferred embodiment of the present invention. The configuration of these antenna devices 107A and 107B is the same or substantially the same as that of the circuit illustrated in FIG. 6 in the first preferred embodiment. However, when a self-inductance of the first coil 31 of the coupling circuit 30 is represented as L1 and a self-inductance of the second coil 32 is represented as L2, the first coil 31 and the second coil 32 of the coupling circuit 30 has a relationship of L2>L1 in the antenna device 107A, and has a relationship of L2<L1 in the antenna device 107B. With the relationship of L2>L1, compared with a case in which L1=L2, the resonant frequency of the parasitic resonant circuit 20 is able to be decreased. Alternatively, when comparison is made at the same resonant frequency, the parasitic resonant circuit 20 is able to be shortened.

In addition, when L2>L1, compared with a configuration in which the inductor is connected (added) to the second coil 32 outside the coupling circuit 30, the entire second coil 32 with a relatively large self-inductance contributes to the coupling with the first coil 31. Thus, a power ratio to be supplied to the parasitic resonant circuit 20 is able to be increased.

In addition, when L2<L1, compared with a configuration in which the inductor is connected (added) to the first coil 31 outside the coupling circuit 30, the entire first coil 31 with a relatively large self-inductance contributes to the coupling with the second coil 32. Thus, a power ratio to be supplied to the parasitic resonant circuit 20 is able to be increased.

Figure 20:
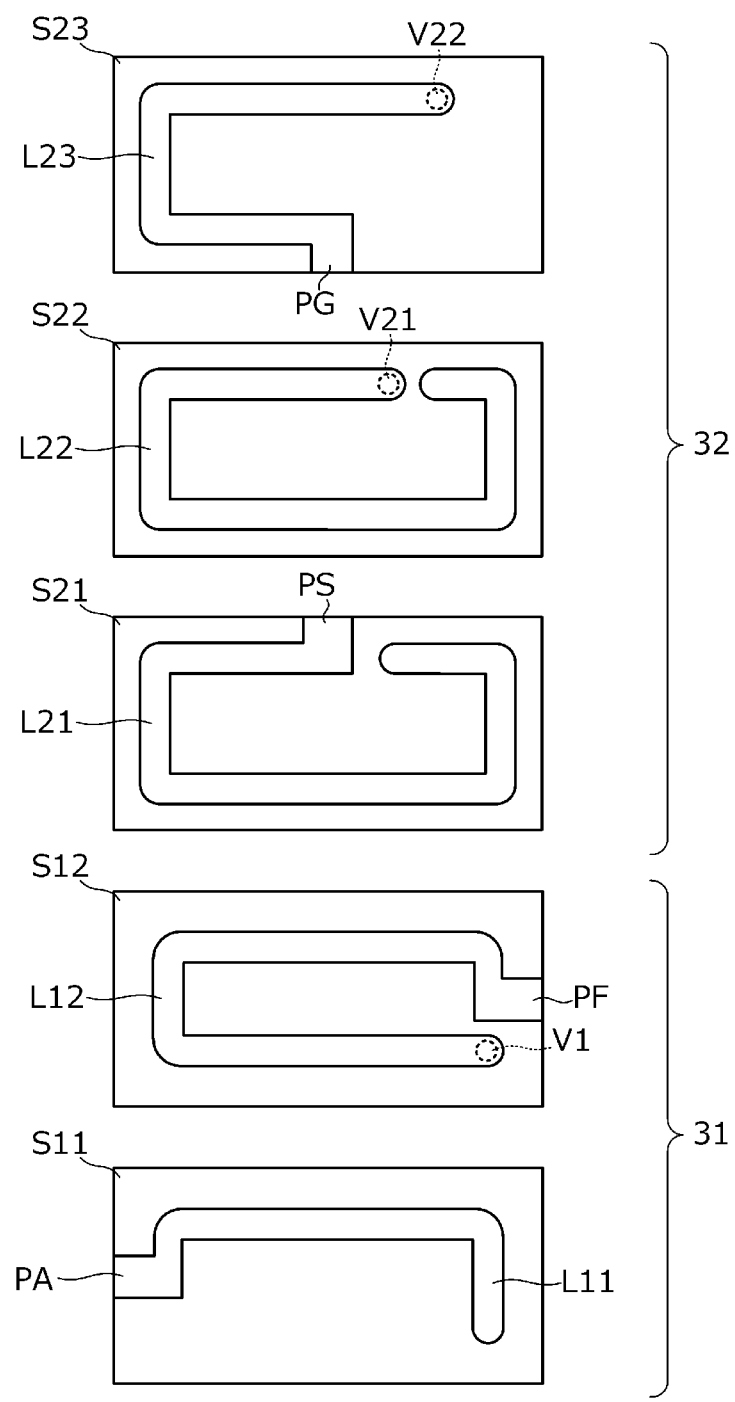
FIG. 20 is an exploded plan view illustrating conductor patterns provided on layers of the coupling circuit 30 according to the seventh preferred embodiment of the present invention.

FIG. 20 is an exploded plan view illustrating conductor patterns provided on layers of the coupling circuit 30 according to the present preferred embodiment. The coupling circuit 30 included in an antenna device according to the present preferred embodiment is a rectangular or substantially rectangular parallelepiped chip component to be mounted on a circuit substrate.

On insulating materials S11, S12, S21, S22, and S23, conductor patterns L11, L12, L21, L22, and L23 are respectively provided. A first end of the conductor pattern L11 is connected to the radiating element connection terminal PA, and a second end thereof is connected to a first end of the conductor pattern L12 via the interlayer connection conductor V1. A second end of the conductor pattern L12 is connected to the feeder circuit connection terminal PF. A first end of the conductor pattern L21 is connected to the parasitic resonant circuit connection terminal PS, and a second end thereof is connected to a first end of the conductor pattern L22 via an interlayer connection conductor V21. A second end of the conductor pattern L22 is connected to a first end of the conductor pattern L23 via an interlayer connection conductor V22. A second end of the conductor pattern L23 is connected to the ground terminal PG.

Figure 21:
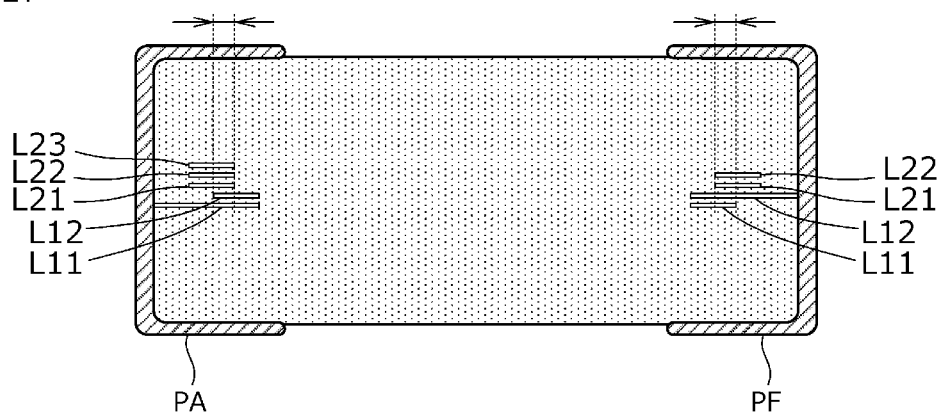
FIG. 21 is a sectional view of the coupling circuit 30 according to the seventh preferred embodiment of the present invention.
Figure 22:
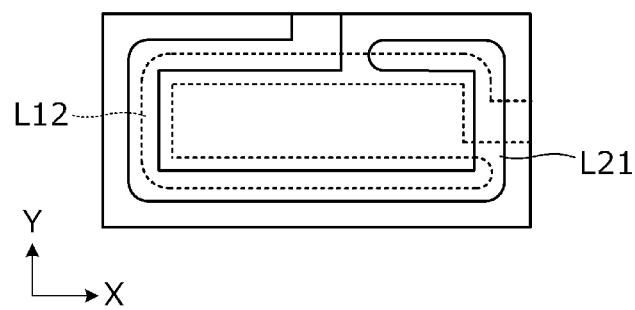
FIG. 22 is a plan view illustrating overlap between a conductor pattern L12 and a conductor pattern L21 in the coupling circuit 30 according to the seventh preferred embodiment of the present invention.

FIG. 21 is a sectional view of the coupling circuit 30. FIG. 22 is a plan view illustrating overlap between the conductor pattern L12 and the conductor pattern L21 in particular. A coil opening or a coil diameter of the conductor patterns L11 and L12 defining the first coil 31 is smaller than a coil opening or a coil diameter of the conductor patterns L21, L22, and L23 defining the second coil 32. In addition, portions of line width of the conductor patterns L11 and L12 and the conductor patterns L21, L22, and L23 overlap with each other. In the example illustrated in FIG. 21 and FIG. 22, about ½ width, for example, is preferably overlapped along the entire or substantially the entire circumference.

Figure 23:
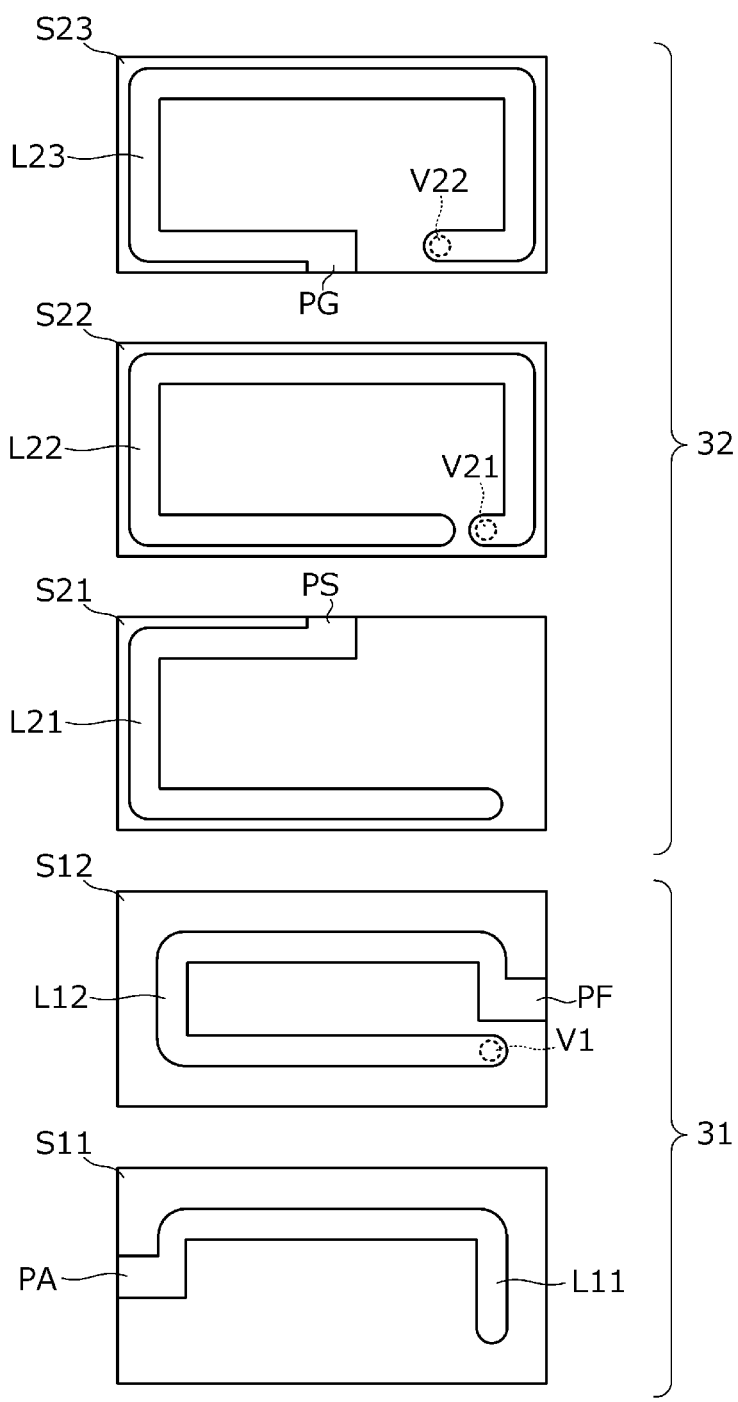
FIG. 23 is an exploded plan view illustrating conductor patterns provided on layers of another coupling circuit 30 according to the seventh preferred embodiment of the present invention.

FIG. 23 is an exploded plan view illustrating conductor patterns provided on layers of another coupling circuit 30 according to the seventh preferred embodiment. The shape and size of the conductor patterns differ from those in the example illustrated in FIG. 20. Among the conductor patterns of the coupling circuit illustrated in FIG. 23, a coil outer diameter of the conductor patterns L11 and L12 defining the first coil 31 is smaller than a coil inner diameter of the conductor patterns L21, L22, and L23 defining the second coil 32.

With the configuration illustrated in FIGS. 20 to 23, a parasitic capacitance generated between the conductor patterns (L11 and L12) defining the first coil 31 and the conductor patterns (L21, L22, and L23) defining the second coil 32 is reduced or prevented. Accordingly, the self-resonant frequency determined by the inductances of the first coil 31 and the second coil 32 and the parasitic capacitance is increased, and the self-resonant frequency is able to be excluded from the communication band to be used.

In addition, even if the conductor patterns (L11 and L12) defining the first coil 31 and the conductor patterns (L21, L22, and L23) defining the second coil 32 are misaligned in a plane direction (X-Y plane direction illustrated in FIG. 22), the portion at which the coil opening of the first coil 31 and the coil opening of the second coil 32 overlap with each other is constantly maintained. Accordingly, a change is small in the coupling degree of magnetic field coupling between the first coil 31 and the second coil 32, the change caused by plane-direction misalignment of the conductor patterns (L11 and L12) defining the first coil 31 and the conductor patterns (L21, L22, and L23) defining the second coil 32.

The examples in FIG. 20 and FIG. 23 are both examples of a coupling circuit in which the above-described relationship L1<L2 is satisfied. When L1>L2, the first coil 31 may be defined by conductor patterns whose coil opening is relatively large.

Note that FIG. 20 and FIG. 23 illustrate examples in which influence on misalignment of the conductor patterns (L11 and L12) defining the first coil 31 and the conductor patterns (L21, L22, and L23) defining the second coil 32 is reduced. Similarly, influence on plane-direction misalignment of the conductor patterns defining the first coil 31 and influence on plane-direction misalignment of the conductor patterns defining the second coil 32 are able to be reduced. For example, coil openings or coil diameters of the conductor patterns L11 and L12 that are adjacent to each other in the stacking direction may differ from each other, and portions of line width thereof may overlap with each other in the structure. Similarly, for example, coil openings or coil diameters of the conductor patterns L21, L22, and L23 that are adjacent to one another in the stacking direction may differ from one another, and portions of line width thereof may overlap with one another in the structure.

Eighth Preferred Embodiment

Figure 24:
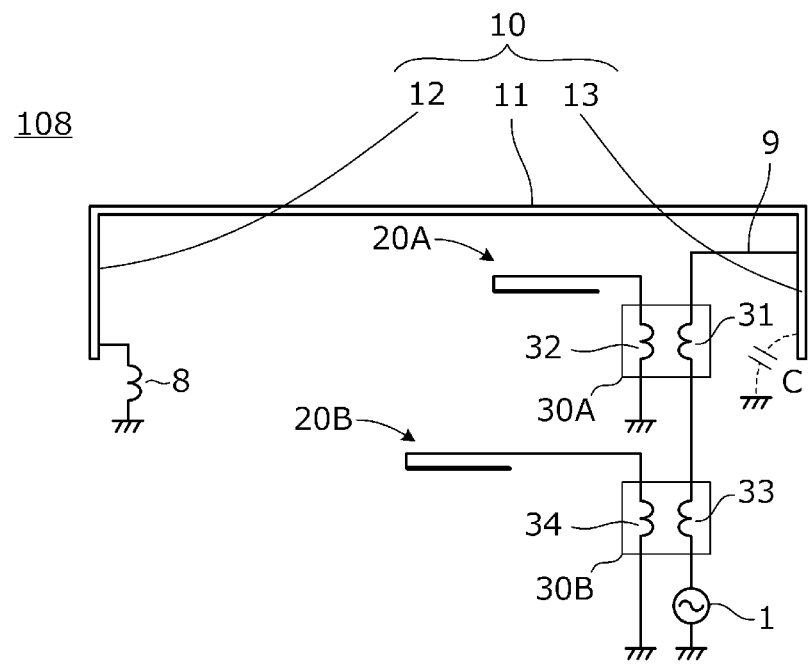
FIG. 24 illustrates a circuit configuration of an antenna device 108 according to an eighth preferred embodiment of the present invention.

FIG. 24 illustrates a circuit configuration of an antenna device 108 according to an eighth preferred embodiment of the present invention. The antenna device 108 includes a first coupling circuit 30A, a second coupling circuit 30B, a first parasitic resonant circuit 20A, and a second parasitic resonant circuit 20B. The second coupling circuit 30B includes a third coil 33 and a fourth coil 34 that are coupled to each other. The third coil 33 of the second coupling circuit 30B is connected between the first coil 31 and the feeder circuit 1. The first parasitic resonant circuit 20A is connected to the second coil 32, and the second parasitic resonant circuit 20B is connected to the fourth coil 34. The remaining configuration is the same or substantially the same as that of the circuit illustrated in FIG. 6 in the first preferred embodiment.

A resonant frequency of the first parasitic resonant circuit 20A and a resonant frequency of the second parasitic resonant circuit 20B differ from each other, and thus, a plurality of poles in accordance with these resonant frequencies are generated, and a communication bandwidth is broadened. In addition, if the resonant frequency of the first parasitic resonant circuit 20A and the resonant frequency of the second parasitic resonant circuit 20B are equal or substantially equal to each other, the poles generated in the two parasitic resonant circuits become deeper, and impedance matching in this frequency band is improved.

Ninth Preferred Embodiment

Figure 25:
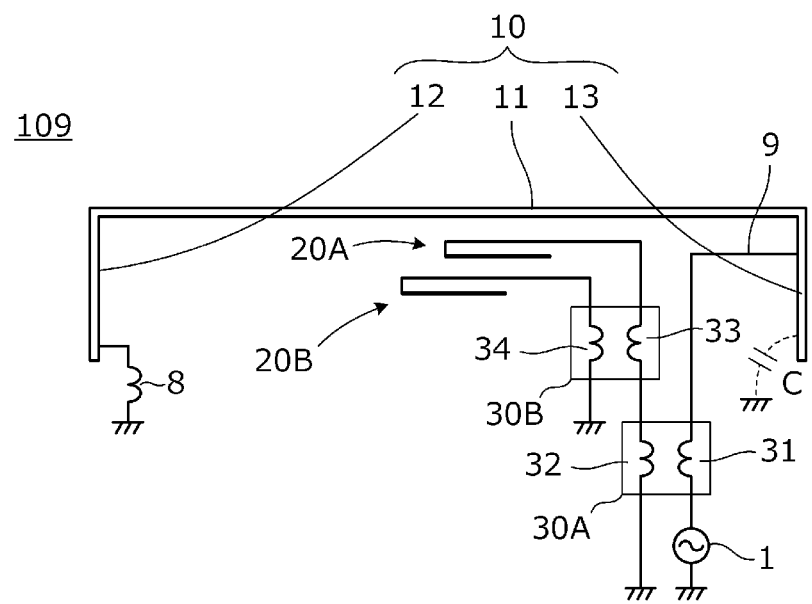
FIG. 25 illustrates a circuit configuration of an antenna device 109 according to a ninth preferred embodiment of the present invention.

FIG. 25 illustrates a circuit configuration of an antenna device 109 according to a ninth preferred embodiment of the present invention. The antenna device 109 includes the first coupling circuit 30A, the second coupling circuit 30B, the first parasitic resonant circuit 20A, and the second parasitic resonant circuit 20B. The second coupling circuit 30B includes the third coil 33 and the fourth coil 34 that are coupled to each other.

The third coil 33 is connected between the second coil and the first parasitic resonant circuit 20A. The first parasitic resonant circuit 20A is connected to the second coil 32, and the second parasitic resonant circuit 20B is connected to the fourth coil 34. The remaining configuration is the same or substantially the same as that of the circuit illustrated in FIG. 6 in the first preferred embodiment.

In the present preferred embodiment, the resonant frequency of the first parasitic resonant circuit 20A and the resonant frequency of the second parasitic resonant circuit 20B are equal or substantially equal to each other, and thus, the poles generated in the two parasitic resonant circuits become deeper, and impedance matching in this frequency band is improved.

Tenth Preferred Embodiment

Figure 26:
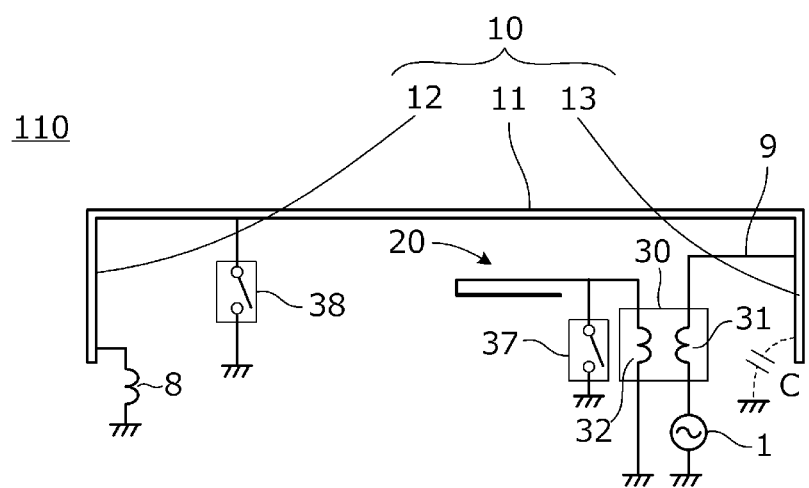
FIG. 26 illustrates a circuit configuration of an antenna device 110 according to a tenth preferred embodiment of the present invention.

FIG. 26 is a circuit diagram of an antenna device 110 according to a tenth preferred embodiment of the present invention. The antenna device 110 includes a switch 37 connected between the parasitic resonant circuit 20 and the ground. The antenna device 110 also includes a switch 38 between the radiating element 10 and the ground. The remaining configuration is the same or substantially the same as that of the circuit illustrated in FIG. 6 in the first preferred embodiment.

The switches 37 and 38 are switched independently or in association with each other. By changing the frequency of a pole generated by providing the coupling circuit 30 and the parasitic resonant circuit 20 in accordance with the state of the switch 37, or by changing a matching state, the impedance matching is able to be improved. In addition, by changing the resonant frequency of the parasitic resonant circuit 20 or by changing the impedance matching state between the coupling circuit 30 and the parasitic resonant circuit 20 so as to make the parasitic resonant circuit 20 be coupled easily to the feeder circuit 1 via the coupling circuit 30, the impedance matching is able to be improved.

In addition, in accordance with the state of the switch 38, the frequency of a pole generated by resonance of the radiating element 10 is able to be changed.

Eleventh Preferred Embodiment

Figure 27A:
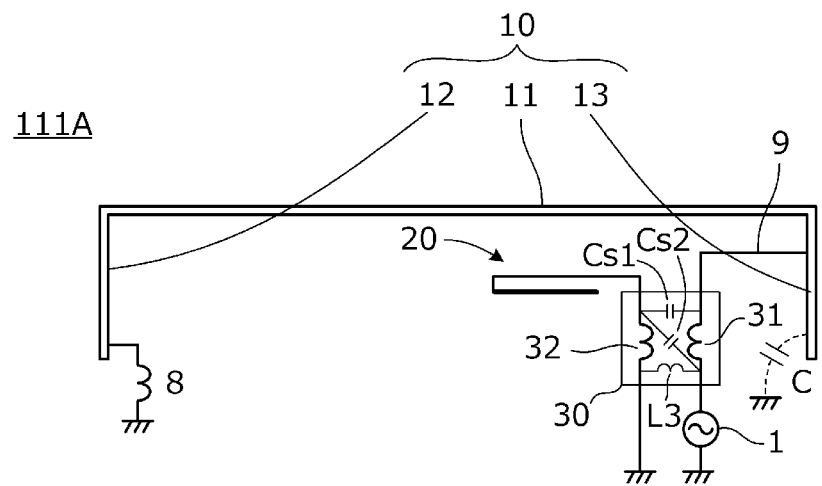
FIGS. 27A and 27B illustrate circuit configurations of antenna devices 111A and 111B according to an eleventh preferred embodiment of the present invention.
Figure 27B:
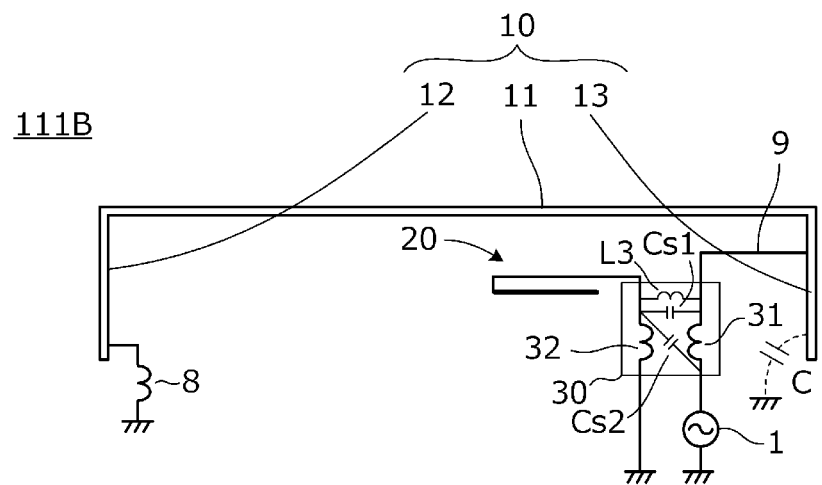

FIGS. 27A and 27B illustrate circuit configurations of antenna devices 111A and 111B according to an eleventh preferred embodiment of the present invention. In the examples in both FIGS. 27A and 27B, parasitic capacitances represented by capacitors Cs1 and Cs2 are included between the first coil 31 and the second coil 32 of the coupling circuit 30. In addition, the coupling circuit 30 includes an inductor L3 connected between the first coil 31 and the second coil 32.

The inductor L3 and the capacitors Cs1 and Cs2 of parasitic capacitances resonate in parallel. Accordingly, a reactance component generated in the coupling circuit 30 is reduced or prevented in the parallel resonant frequency band. Thus, a reactance component that is added by including the coupling circuit 30 is canceled, and a change from a matching state in which the coupling circuit 30 is not mounted is able to be reduced or prevented.

Twelfth Preferred Embodiment

Figure 28:
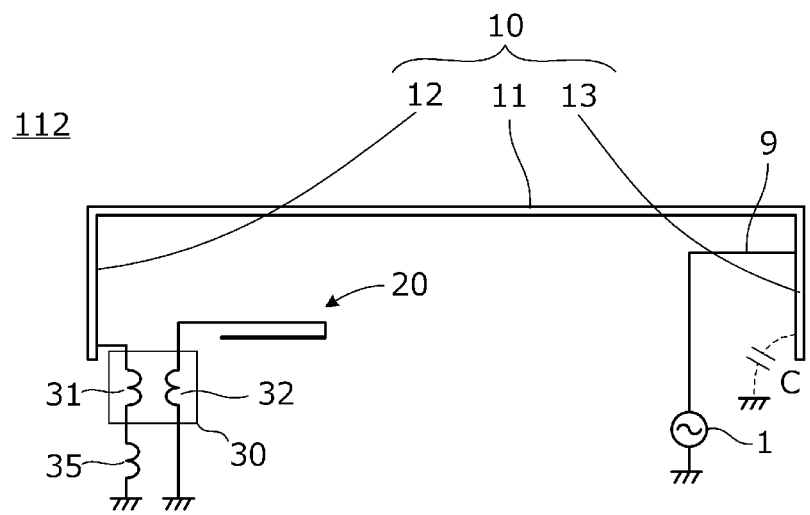
FIG. 28 illustrates a circuit configuration of an antenna device 112 according to a twelfth preferred embodiment of the present invention.

FIG. 28 illustrates a circuit configuration of an antenna device 112 according to a twelfth preferred embodiment of the present invention.

The antenna device 112 according to the present preferred embodiment includes the radiating element 10, the coupling circuit 30, and the parasitic resonant circuit 20. The feeder circuit 1 is connected to the radiating element 10. The coupling circuit 30 includes the first coil 31 that is connected between the radiating element 10 and the ground, and the second coil 32 coupled to the first coil 31. The parasitic resonant circuit 20 is connected to the second coil 32. Also, the inductor 35 is included between the first coil 31 and the ground in this example.

With the above configuration, the radiating element 10 and the parasitic resonant circuit 20 do not interfere with each other in terms of radiation, and a radiation characteristic of the radiating element 10 is not adversely affected. In addition, a frequency characteristic of a return loss of the radiating element 10 seen from the feeder circuit 1 is adjusted by the resonance characteristic of the parasitic resonant circuit 20, and a pole is generated in a desired frequency band to broaden the band of the frequency characteristic of the antenna. Since a current intensity is particularly high in a portion that is connected to the ground, the radiating element 10 and the parasitic resonant circuit 20 are able to be coupled to each other via the coupling circuit 30. In addition, the coupling circuit 30 and the parasitic resonant circuit 20 are able to be provided with a higher degree of freedom.

Thirteenth Preferred Embodiment

Figure 29:
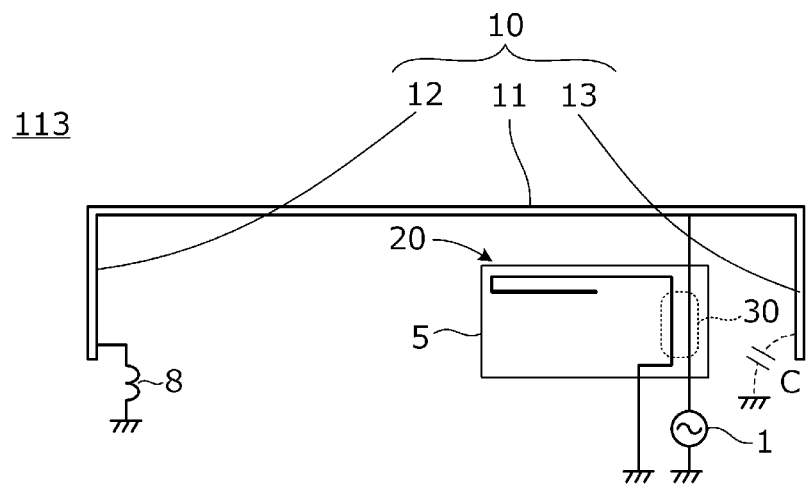
FIG. 29 illustrates a circuit configuration of an antenna device 113 according to a thirteenth preferred embodiment of the present invention.

FIG. 29 illustrates a circuit configuration of an antenna device 113 according to a thirteenth preferred embodiment of the present invention.

The antenna device 113 according to the present preferred embodiment includes a substrate 5 on which the coupling circuit 30 and the parasitic resonant circuit 20 are each provided using conductor patterns. The remaining configuration is the same or substantially the same as that of the circuit illustrated in FIG. 6 in the first preferred embodiment.

The substrate 5 is preferably, for example, a resin multi-layer substrate or a ceramic multi-layer substrate. In a case of a resin multi-layer substrate, for example, a plurality of thermoplastic resin materials on surfaces of which copper-foil patterns are provided are stacked and pressed with heat. In a case of a ceramic multi-layer substrate, a plurality of ceramic green sheets on surfaces of which conductor-paste patterns are provided are stacked and fired.

Note that in a case in which the coupling circuit 30 and the parasitic resonant circuit 20 are provided on different substrates, the parasitic resonant circuit 20 may be the resin multi-layer substrate or the ceramic multi-layer substrate.

According to the present preferred embodiment, since the coupling circuit 30 and the parasitic resonant circuit 20 are integrated with each other, the area used is reduced.

Fourteenth Preferred Embodiment

A fourteenth preferred embodiment of the present invention will illustrate an antenna device including a PIFA (planar inverted-F antenna) and a parasitic radiating element.

Figure 30:
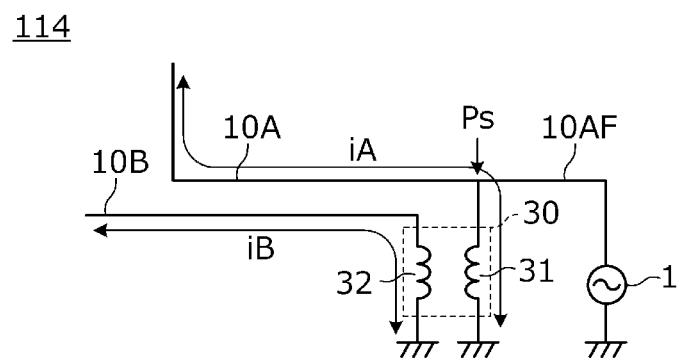
FIG. 30 illustrates a circuit configuration of an antenna device 114 according to a fourteenth preferred embodiment of the present invention.

FIG. 30 illustrates a circuit configuration of an antenna device 114 according to the fourteenth preferred embodiment. The antenna device 114 according to the present preferred embodiment includes a feeding radiating element 10A, a feeding line 10AF, a parasitic radiating element 10B, and the coupling circuit 30. The feeder circuit 1 is connected between the feeding line 10AF and the ground. The configuration and advantageous effects of the coupling circuit 30 are as described in the above-described preferred embodiments.

The first coil 31 of the coupling circuit 30 is connected between a connection point Ps between the feeding radiating element 10A and the feeding line AF and the ground. The feeding radiating element 10A, the feeding line 10AF, and the first coil 31 define a PIFA. That is, the first coil 31 of the coupling circuit 30 is provided at a portion of a short pin of the PIFA. The short pin connects the connection point Ps and the ground to each other. A capacitor or an inductor may be provided in this portion.

The parasitic radiating element 10B is preferably, for example, a monopole parasitic radiating element. The second coil 32 of the coupling circuit 30 is provided in the vicinity of a ground end of the parasitic radiating element 10B.

A resonant current iA of the feeding radiating element flows between an open end of the feeding radiating element 10A and a ground end of the first coil 31. In addition, a resonant current iB flows between an open end of the parasitic radiating element 10B and a ground end of the second coil 32. A phase of the current iA flowing in the feeding radiating element 10A and a phase of the current iB flowing in the parasitic radiating element 10B differ from each other.

In general, if the phase of resonance of the feeding radiating element and the phase of resonance of the parasitic radiating element are the same, a notch is provided between the two resonant frequencies in a frequency characteristic of the antenna device. Therefore, the band cannot be broadened even if the parasitic radiating element is provided. That is, the parasitic radiating element cannot be provided adjacent to the feeding radiating element in order to broaden the band.

In contrast, in the present preferred embodiment, the current flowing in the first coil 31 of the coupling circuit 30 and the current flowing in the second coil 32 have a phase difference. Therefore, the phase of resonance of the feeding radiating element 10A and the phase of resonance of the parasitic radiating element 10B are not the same, and thus, a notch is not provided between the two resonant frequencies. The phase difference between the first coil 31 and the second coil 32 is preferably, for example, about 180° or less, and a phase difference of less than or equal to about 180° is generated by a parasitic component. That is, by an effect of the parasitic capacitance between the first coil 31 and the second coil 32, the phase difference between the current flowing in the first coil 31 and the current flowing in the second coil 32 is preferably, for example, greater than about 0° and less than about 180°.

As illustrated in FIG. 30, since the resonant current iA flows between the open end and the short position in the PIFA, the phase of current flowing in the feeder circuit 1 and the phase of the resonant current iA differ from each other. Accordingly, if the first coil 31 of the coupling circuit 30 is provided in the feeding line 10AF and the parasitic radiating element 10B is connected to the second coil 32, since there is no correlation between the phase of the current iB flowing in the parasitic radiating element 10B and the phase of the current iA flowing in the feeding radiating element 10A, as described above, the resonance of the feeding radiating element 10A and the resonance of the parasitic radiating element 10B may have the same phase, in which case, the notch is provided. In the present preferred embodiment, such a problem does not arise, and the parasitic radiating element 10B and the feeding radiating element 10A are able to be provided adjacent to each other.

Although the present preferred embodiment is an example of the feeding radiating element being a PIFA, the feeding radiating element is not limited to a PIFA and may be a typical inverse-F antenna. The same or substantially the same advantageous effects are able to be obtained.

Fifteenth Preferred Embodiment

A fifteenth preferred embodiment of the present invention will illustrate an example of an antenna device including a plurality of parasitic radiating elements.

Figure 31A:
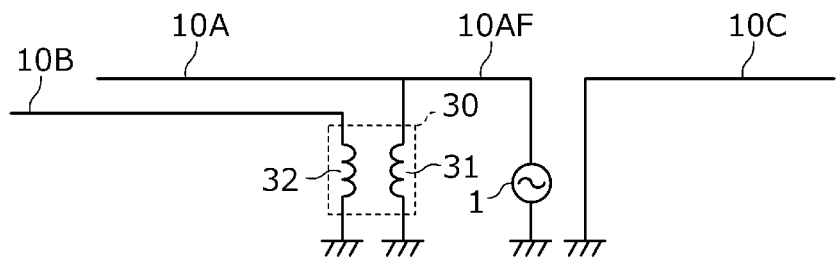
FIG. 31A illustrates a circuit configuration of an antenna device 115 according to a fifteenth preferred embodiment of the present invention.

FIG. 31A illustrates a circuit configuration of an antenna device 115 according to the fifteenth preferred embodiment. The antenna device 115 according to the present preferred embodiment includes the feeding radiating element 10A, the feeding line 10AF, the parasitic radiating element 10B, a parasitic radiating element 10C, and the coupling circuit 30. The feeder circuit 1 is connected between the feeding line 10AF and the ground.

The parasitic radiating element 10C is, at around a ground end thereof, mainly coupled to the feeding line 10AF to the feeding radiating element 10A. The remaining configuration is the same or substantially the same as that of the antenna device 114 illustrated in FIG. 30.

Figure 31B:
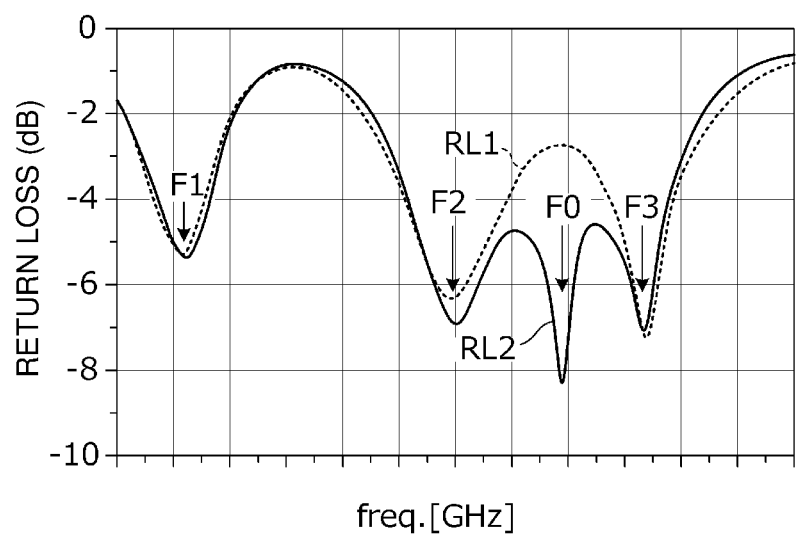
FIG. 31B illustrates a frequency characteristic of a return loss of the antenna device 115 illustrated in FIG. 31A and an antenna device according to a comparative example.

FIG. 31B illustrates a frequency characteristic of a return loss of the antenna device 115 illustrated in FIG. 31A and an antenna device according to a comparative example. In FIG. 31B, a return loss characteristic RL1 is a return loss of the antenna device 115 according to the present preferred embodiment, and a return loss characteristic RL2 is a return loss of the antenna device according to the comparative example. The antenna device according to the comparative example is an antenna device in which the coupling circuit 30 and the parasitic radiating element 10B are not included and the first coil 31 merely defines and functions as a short pin of a PIFA. In either antenna device, a pole is generated at a center frequency F1 of a low band. This is due to ¼ wavelength resonance of the feeding radiating element 10A. Another pole is generated at a frequency F2. This is due to ¾ wavelength resonance of the feeding radiating element 10A. Still another pole is generated at a frequency F3. This is due to ¼ wavelength resonance of the monopole parasitic radiating element 10C.

In the antenna device 115 according to the present preferred embodiment, a pole is also generated at a frequency F0. This is due to a resonance characteristic of the parasitic radiating element 10B. In this manner, it is possible to define an antenna device including the parasitic radiating element 10B that is connected to the coupling circuit 30 and the parasitic radiating element 10C that does not interpose coupling of the coupling circuit 30.

Also in the present preferred embodiment, the feeding radiating element is not limited to a PIFA and may be a typical inverse-F antenna. The same or substantially the same advantageous effects are obtained.

Sixteenth Preferred Embodiment

A sixteenth preferred embodiment of the present invention will illustrate an example of an antenna device including a plurality of parasitic radiating elements.

Figure 32:
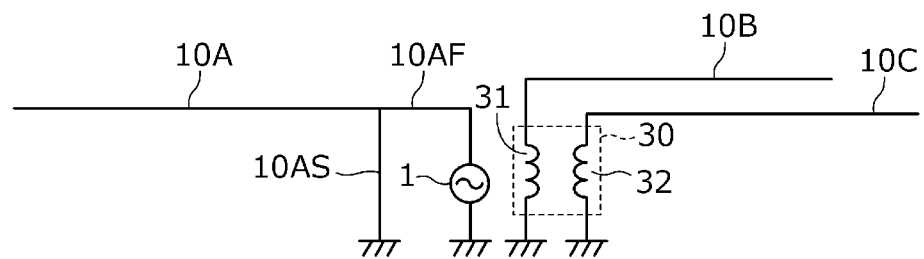
FIG. 32 illustrates a circuit configuration of an antenna device 116 according to a sixteenth preferred embodiment of the present invention.

FIG. 32 illustrates a circuit configuration of an antenna device 116 according to the sixteenth preferred embodiment. The antenna device 116 according to the present preferred embodiment includes the feeding radiating element 10A, the feeding line 10AF, a short pin 10AS, the parasitic radiating elements 10B and 10C, and the coupling circuit 30. The feeding radiating element 10A is a radiating element of a PIFA.

In the present preferred embodiment, the first coil 31 of the coupling circuit 30 is provided around the ground end of the parasitic radiating element 10B, and the second coil 32 of the coupling circuit 30 is provided around the ground end of the parasitic radiating element 10C. The parasitic radiating element 10B is, at around the ground end thereof, mainly coupled to the feeding line 10AF to the feeding radiating element 10A.

As in the present preferred embodiment, the two parasitic radiating elements 10B and 10C may be coupled to each other via the coupling circuit 30.

Note that in the present preferred embodiment, the feeding radiating element is not limited to a PIFA or an inverted-F antenna, and may be, for example, a monopole radiating element. That is, any feeding radiating element that is coupled to the parasitic radiating element 10B may be used, and the same or substantially the same advantageous effects are obtained.

Seventeenth Preferred Embodiment

Figure 33:
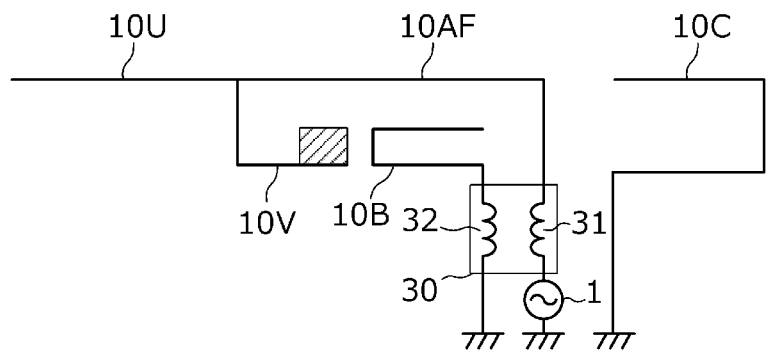
FIG. 33 illustrates a circuit configuration of an antenna device 117 according to a seventeenth preferred embodiment of the present invention.

FIG. 33 illustrates a circuit configuration of an antenna device 117 according to a seventeenth preferred embodiment of the present invention. The antenna device 117 according to the present preferred embodiment includes feeding radiating elements 10U and 10V, the feeding line 10AF, the parasitic radiating element 10B, the parasitic radiating element 10C, and the coupling circuit 30. The feeder circuit 1 is connected between the feeding line 10AF and the ground. The configuration and advantageous effects of the coupling circuit 30 are as described in the above-described preferred embodiments.

The feeding radiating elements 10U and 10V and the feeding line 10AF define a branch-feeding monopole antenna or a branch-feed PIFA. The parasitic radiating element 10C is mainly coupled with the feeding line 10AF to define and function as a monopole or an inverted-L-type antenna.

Figure 34:
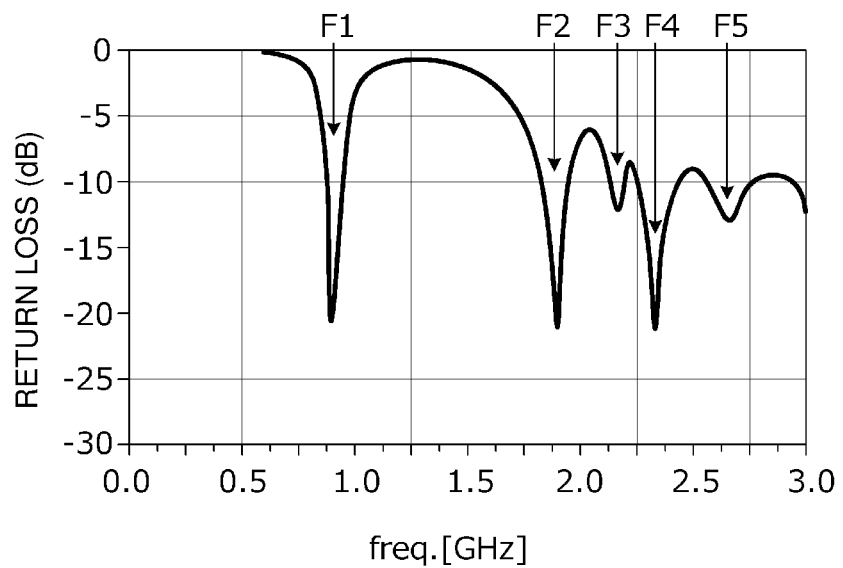
FIG. 34 illustrates a frequency characteristic of a return loss of the antenna device 117.

FIG. 34 illustrates a frequency characteristic of a return loss of the antenna device 117. In FIG. 34, a pole indicated by a frequency F1 is mainly due to a fundamental wave generated in the feeding radiating element 10U and the feeding line 10AF in a branch antenna defined by the feeding radiating elements 10U and 10V and the feeding line 10AF. A pole indicated by a frequency F2 is due to a fundamental wave generated in the parasitic radiating element 10C. A pole indicated by a frequency F3 is mainly caused by, for example, a ¾ wavelength harmonic generated in the feeding radiating element 10U and the feeding line 10AF. A pole indicated by a frequency F4 is due to a fundamental wave generated in the parasitic radiating element 10B. A pole indicated by a frequency F5 is mainly due to resonance generated in the feeding radiating element 10V in the branch antenna defined by the feeding radiating elements 10U and 10V and the feeding line 10AF.

Note that a parasitic capacitance is actively generated between the feeding radiating element 10V and the parasitic radiating element 10B so that a phase difference of resonant current between the feeding radiating element 10V and the parasitic radiating element 10B is about 90°.

Thus, a pole of the feeding radiating element 10V indicated by the frequency F4 and a pole of the parasitic radiating element 10B indicated by the frequency F5 are generated.

In the antenna device according to the present preferred embodiment, by including the branch antenna including the feeding radiating element 10V, a communication band that is broadened to about 2700 MHz is able to be covered, and a broad-band antenna that covers a low band of about 700 MHz to about 900 MHz and a high band of about 1700 MHz to about 2700 MHz is able to be provided.

Eighteenth Preferred Embodiment

Figure 35:
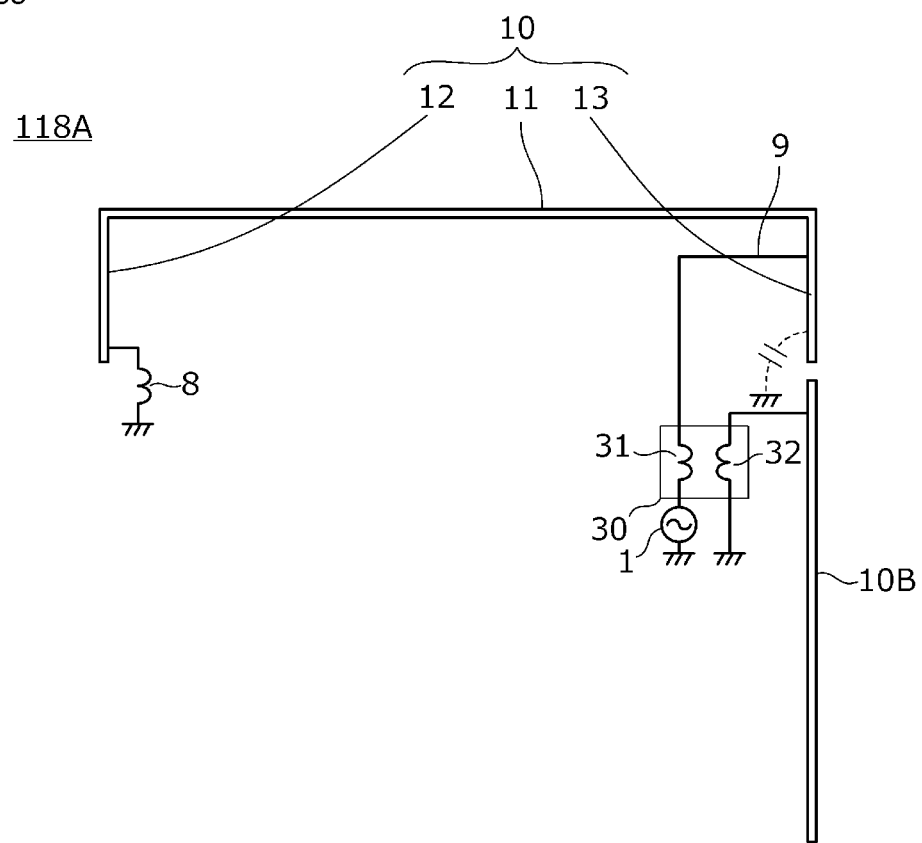
FIG. 35 is a circuit diagram of an antenna device 118A according to an eighteenth preferred embodiment of the present invention.

FIG. 35 is a circuit diagram of an antenna device 118A according to an eighteenth preferred embodiment of the present invention. In the antenna device 118A, the parasitic radiating element 10B is provided at a side surface portion of the metal housing. The second coil 32 of the coupling circuit 30 is connected to the parasitic radiating element 10B. The remaining configuration is the same or substantially the same as that of the circuit illustrated in FIG. 6 in the first preferred embodiment.

With the structure of the antenna device 118A, the parasitic radiating element 10B is able to be separated from the radiating element 10, and a good radiation characteristic is able to be obtained at a resonant frequency that is added by the coupling circuit 30 and the parasitic radiating element 10B. Furthermore, the radiation characteristic of the radiating element 10 is not degraded at frequencies other than the resonant frequency.

Figure 36:
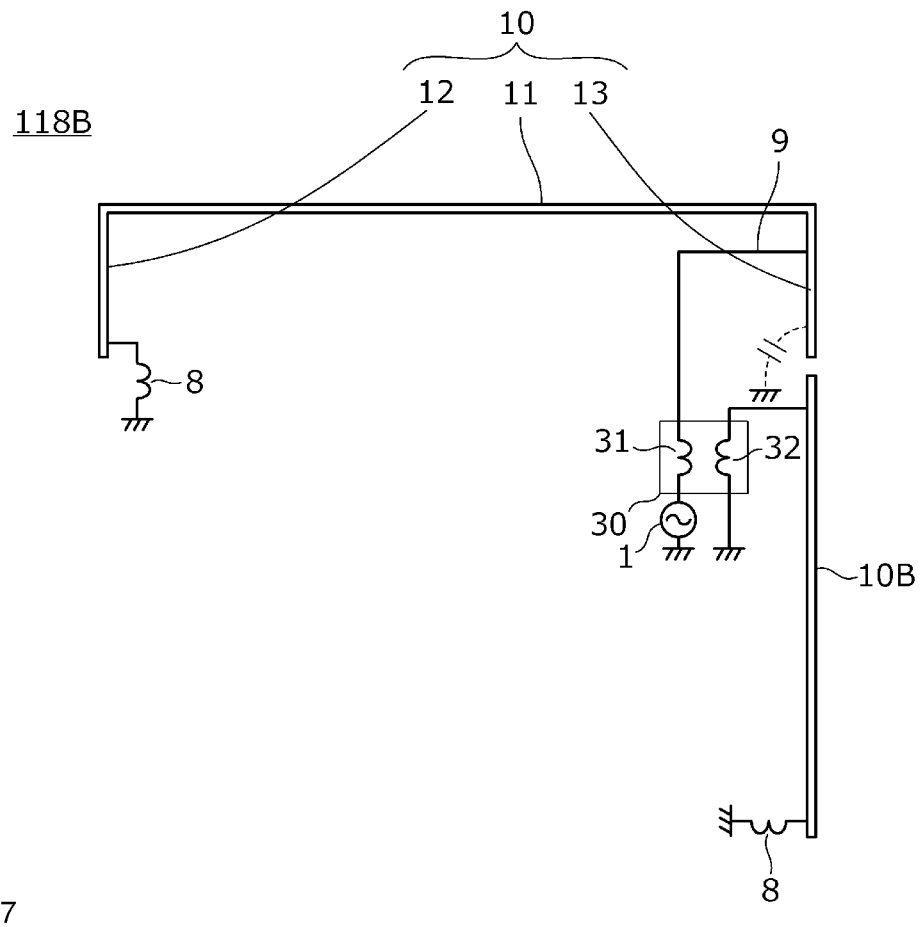
FIG. 36 is a circuit diagram of another antenna device 118B according to the eighteenth preferred embodiment of the present invention.

FIG. 36 is a circuit diagram of another antenna device 118B according to the eighteenth preferred embodiment. In the antenna device 118B, the parasitic radiating element 10B is provided at a side surface portion of the metal housing. An end portion of the parasitic radiating element 10B is connected to the ground (is grounded) of a circuit substrate via the inductor 8. The parasitic radiating element 10B defines and functions as a ½ wavelength resonant antenna.

With the structure of the antenna device 118B, since the tip of the side surface portion of the metal housing is grounded, variations in antenna characteristic due to a change of surrounding environment are able to be reduced or prevented. Even in a case in which a side surface portion of another metal housing that is grounded via a slit is present forward of the tip of the side surface portion of the metal housing, since the tip of the side surface portion of the metal housing is grounded, a field maximum point moves from the tip of the parasitic radiating element 10B toward a center, and a good radiation characteristic is able to be obtained at a resonant frequency that is added by the coupling circuit 30. Furthermore, the resonant frequency is able to be easily adjusted by the inductance of the inductor 8.

Figure 37:
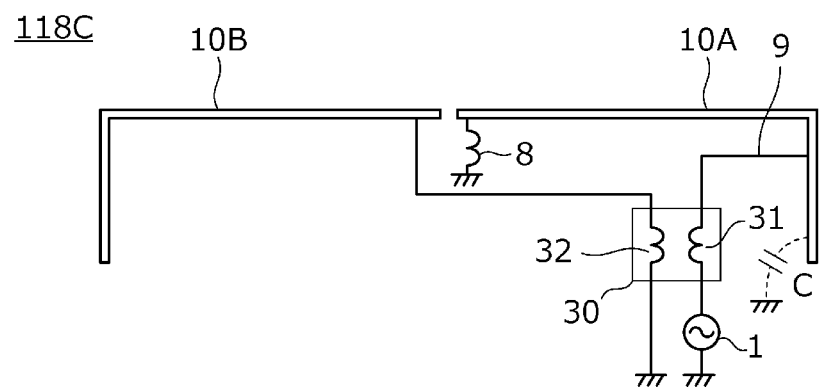
FIG. 37 is a circuit diagram of another antenna device 118C according to the eighteenth preferred embodiment of the present invention.

FIG. 37 is a circuit diagram of another antenna device 118C according to the eighteenth preferred embodiment. In the antenna device 118C, the feeding radiating element 10A is provided from an end surface portion of the metal housing to a side surface portion thereof. Similarly, the parasitic radiating element 10B is provided from an end surface portion of the metal housing to a side surface portion thereof. In this manner, the main portion of the parasitic radiating element 10B may be provided at the end surface portion of the metal housing. In addition, the parasitic radiating element 10B may be close to a ground end of the parasitic radiating element 10A. With this structure, since a field maximum point of the feeding radiating element 10A moves from the ground end toward a center, unnecessary interference between the parasitic radiating element 10A and the parasitic radiating element 10B is able to be reduced or prevented.

Nineteenth Preferred Embodiment

Figure 38:
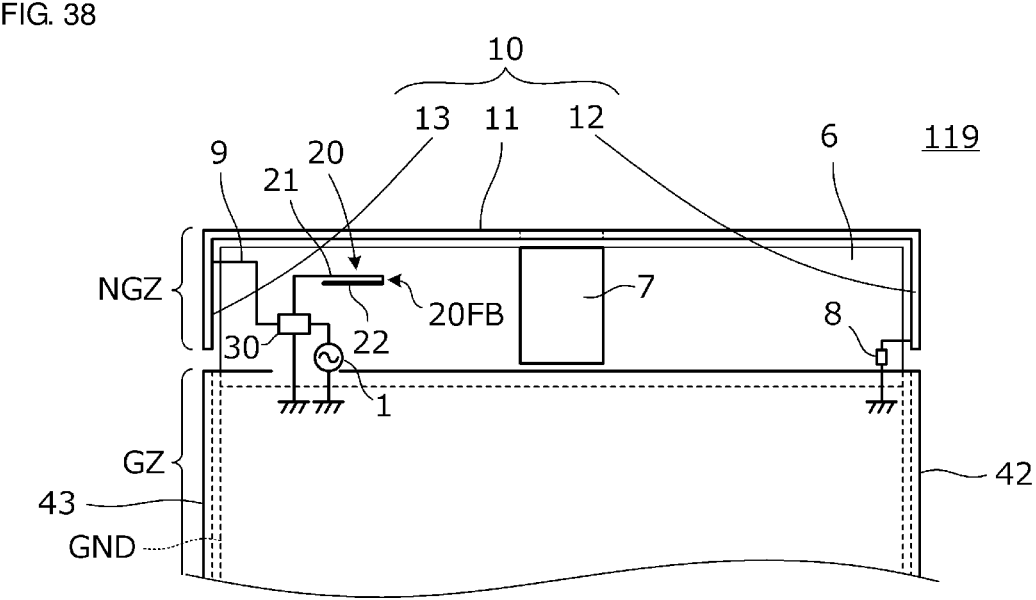
FIG. 38 is a plan view of a main portion of an antenna device 119 according to a nineteenth preferred embodiment of the present invention.

FIG. 38 is a plan view of a main portion of an antenna device 119 according to a nineteenth preferred embodiment of the present invention.

A metal housing of electronic equipment includes the radiating element 10, which is an end portion of the metal housing. A connection position of the feeding line 9 of the radiating element 10 and a position of the parasitic resonant circuit 20 differ from those in the antenna device 101 illustrated in FIG. 5 in the first preferred embodiment.

In the present preferred embodiment, in a plan view of the circuit substrate 6, the feeding line 9 is connected to the left side surface portion 13 of the radiating element 10. Accordingly, the parasitic resonant circuit 20 is disposed on the right side of the coupling circuit 30. This positional relationship is an alternative configuration (symmetrical relationship) to the example illustrated in FIG. 5. The remaining configuration is the same or substantially the same as that illustrated in the first preferred embodiment.

Figure 39:
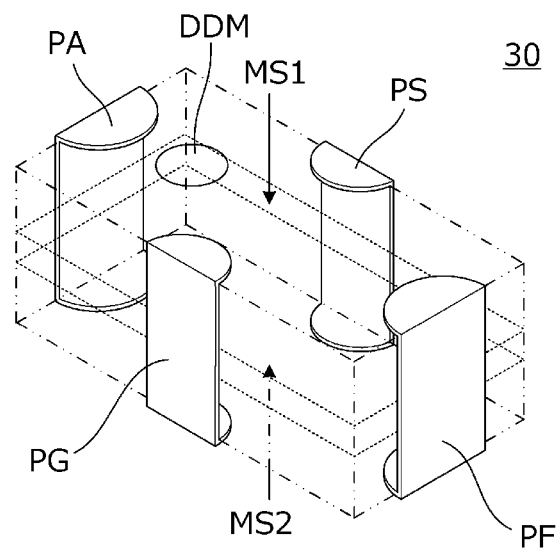
FIG. 39 is a perspective view of the coupling circuit 30 according to the nineteenth preferred embodiment of the present invention.

FIG. 39 is a perspective view of the coupling circuit 30 according to the present preferred embodiment. The external structure of the coupling circuit 30 is represented by a two-dotted-and-dashed line. On an outer surface of the coupling circuit 30, the feeder circuit connection terminal PF, the radiating element connection terminal PA, the ground terminal PG, and the parasitic resonant circuit connection terminal PS are provided. The coupling circuit 30 is the same or substantially the same as the coupling circuit 30 illustrated in FIG. 1 in the first preferred embodiment. However, the second surface MS2 is the mount surface, and this surface faces the circuit substrate. On a top surface (first surface) that is a surface opposite to the mount surface (second surface) MS2, the direction discrimination mark DDM is provided. Thus, the position of the terminals differ from that in the coupling circuit 30 illustrated in FIG. 1 in a plan view. In the coupling circuit 30 illustrated in FIG. 1, in a plan view, the ground terminal PG, the feeder circuit connection terminal PF, and the parasitic resonant circuit connection terminal PS are disposed clockwise in this order from the radiating element connection terminal PA. In the nineteenth preferred embodiment, as illustrated in FIG. 39, the ground terminal PG, the feeder circuit connection terminal PF, and the parasitic resonant circuit connection terminal PS are disposed counterclockwise in this order from the radiating element connection terminal PA.

As described above, since the first end and the second end of the first coil and the first end and the second end of the second coil are provided on both of the first surface MS1 and the second surface MS2, either the first surface or the second surface may define and function as the mount surface. Accordingly, either the first surface MS1 or the second surface MS2 of the coupling circuit 30 may be selected as the mount surface to be mounted on a circuit substrate such that the terminals are disposed at positions appropriate for the position of a circuit or an element to which the first coil and the second coil provided on the coupling circuit 30 are connected.

The examples illustrated in FIG. 1 and FIG. 39 illustrate examples in which interlayer connection conductors that connect the four terminals provided on the first surface MS1 and the four terminals provided on the second surface MS2 to each other are provided on end surfaces of the multi-layer body. However, a plurality of via conductors may be provided inside the multi-layer body, and the four terminals provided on the first surface MS1 and the four terminals provided on the second surface MS2 may be connected to each other via these via conductors.

In addition to the via conductors, LGA (Land Grid Array) terminals may be provided on the mount surface of the coupling circuit 30.

Figure 40:
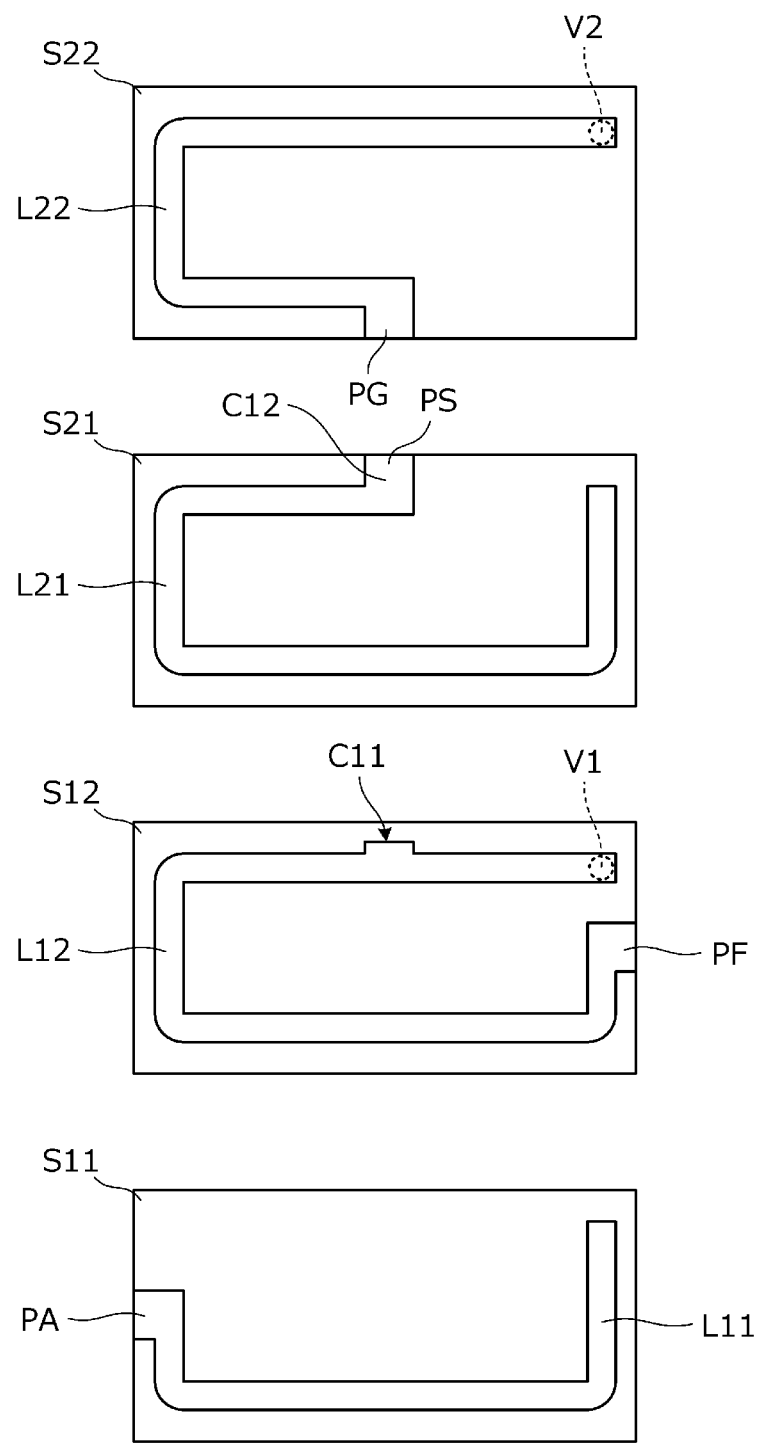
FIG. 40 illustrates a configuration of another coupling circuit 30 according to the nineteenth preferred embodiment of the present invention and is an exploded plan view illustrating conductor patterns provided on layers of the coupling circuit 30.

FIG. 40 illustrates a configuration of another coupling circuit 30 according to the present preferred embodiment and is an exploded plan view illustrating conductor patterns provided on layers of the coupling circuit 30.

As illustrated in FIG. 40, the first conductor pattern L11, the second conductor pattern L12, the third conductor pattern L21, and the fourth conductor pattern L22 are provided on the insulating material S11, the insulating material S12, the insulating material S21, and the insulating material S22, respectively. The insulating materials S11, S12, S21, and S22 are stacked such that the coil conductor patterns are disposed in the following order from a layer close to the mount surface: the first conductor pattern L11, the second conductor pattern L12, the third conductor pattern L21, and the fourth conductor pattern L22.

The first end of the first conductor pattern L11 is connected to the radiating element connection terminal PA, and the second end thereof is connected to the first end of the second conductor pattern L12 via the interlayer connection conductor V1. The second end of the second conductor pattern L12 is connected to the feeder circuit connection terminal PF. The first end of the third conductor pattern L21 is connected to the parasitic resonant circuit connection terminal PS, and the second end of the third conductor pattern L21 is connected to the first end of the fourth conductor pattern L22 via the interlayer connection conductor V2. The second end of the fourth conductor pattern L22 is connected to the ground terminal PG.

The conductor patterns on layers illustrated in FIG. 40 are in a symmetrical relationship with the conductor patterns illustrated in FIG. 2. Thus, in the coupling circuit including these conductor patterns, in a plan view, the ground terminal PG, the feeder circuit connection terminal PF, and the parasitic resonant circuit connection terminal PS are disposed counterclockwise in this order from the radiating element connection terminal PA.

As in this example, the terminals may be provided at positions appropriate for the position of a circuit or an element to which the first coil and the second coil provided in the coupling circuit 30 are connected.

Twentieth Preferred Embodiment

A twentieth preferred embodiment of the present invention will illustrate an antenna device further including a phase shifter.

Figure 41:
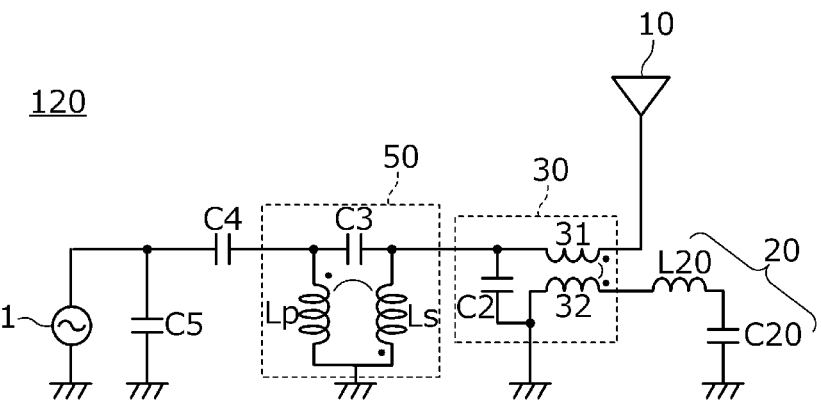
FIG. 41 is a circuit diagram of an antenna device 120 according to a twentieth preferred embodiment of the present invention in which a feeder circuit 1 is connected.

FIG. 41 is a circuit diagram of an antenna device 120 according to the twentieth preferred embodiment in which the feeder circuit 1 is connected. In the antenna device 120, a phase shifter 50 is connected between the feeder circuit 1 and the first coil 31 of the coupling circuit 30. The phase shifter 50 is a phase shifter by which a phase shift amount changes depending on the frequency (has frequency dependency). The phase shifter 50 includes a first coil Lp, a second coil Ls, and a capacitor C3 that are coupled to one another.

Note that in this example, capacitors C4 and C5 to perform impedance matching are connected between feeder circuit 1 and the phase shifter 50.

The configuration of the coupling circuit 30, the radiating element 10, and the parasitic resonant circuit 20 is the same or substantially the same as that illustrated in the first preferred embodiment.

Figure 42:
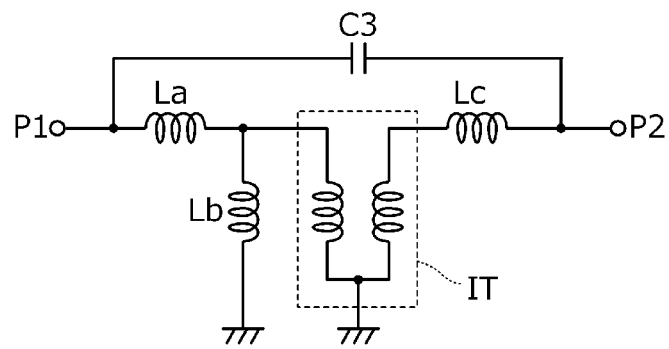
FIG. 42 is an equivalent circuit diagram illustrating a phase shifter 50 according to the twentieth preferred embodiment of the present invention in which an ideal transformer IT and parasitic inductance components are separately illustrated.

FIG. 42 is an equivalent circuit diagram illustrating the phase shifter 50 in which an ideal transformer IT and parasitic inductance components (series parasitic inductance components La and Lc and parallel parasitic inductance component Lb) are separately illustrated.

Although the impedance of the transformer deviates from a predetermined value (e.g., about 50Ω) due to the parasitic inductance components (inductors La, Lb, and Lc), by including the capacitor C2 illustrated in FIG. 41, the impedance of the transformer is adjusted to be the predetermined value. In particular, the capacitor C2 corrects the impedance shift due to the parallel parasitic inductance component Lb, and the capacitor C3 corrects the impedance shift due to the series parasitic inductance components La and Lc.

The coupling coefficient between the first coil Lp and the second coil Ls illustrated in FIG. 41 is lower than that of a common high-frequency transformer, and accordingly, the series parasitic inductance component Lc is large. However, since the capacitance of the capacitor C3 is also large, impedance matching is achieved. In addition, since the capacitance of the capacitor C3 is large, a ratio of a high-band signal bypassing the capacitor C3 is higher than that bypassing the transformer defined by the first coil Lp and the second coil Ls, and a phase shifting effect of the transformer is small. On the other hand, as for a low band, the amount bypassing the capacitor C3 is relatively small, and the phase shifting effect of the transformer is large. Thus, the coupling coefficient is preferably determined such that the phase shift amount with respect to a low-band signal is substantially 180° and the phase shift amount with respect to a high-band signal is substantially 90°.

Figure 43:
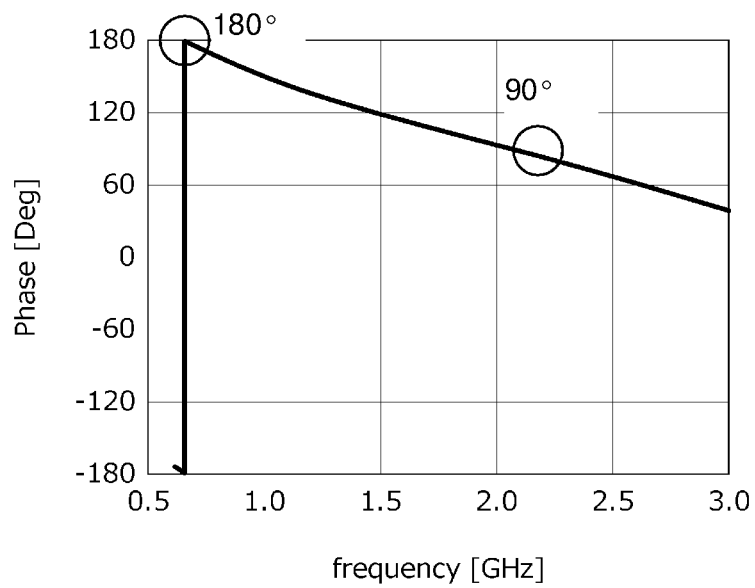
FIG. 43 illustrates a frequency characteristic of a phase shift amount of the phase shifter 50.

FIG. 43 illustrates a frequency characteristic of the phase shift amount of the phase shifter 50. In this example, the phase shift amount in a low band (about 700 MHz to about 900 MHz band) is substantially 180°, and the phase shift amount in a high band (about 1.7 GHz to about 2.7 GHz band) is substantially 90°.

Figure 44A:
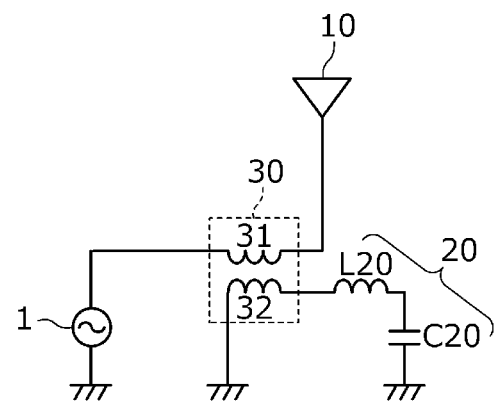
FIG. 44A is a circuit diagram of the antenna device illustrated in the first preferred embodiment of the present invention, which does not include the phase shifter 50.

Next, effects obtained by providing the phase shifter 50 together with the coupling circuit 30 will be described. FIG. 44A is a circuit diagram of the antenna device illustrated in the first preferred embodiment, which does not include the phase shifter 50, and FIG. 44B illustrates impedance loci representing, on a Smith chart, impedances when seeing the antenna device from the feeder circuit 1.

Figure 45A:
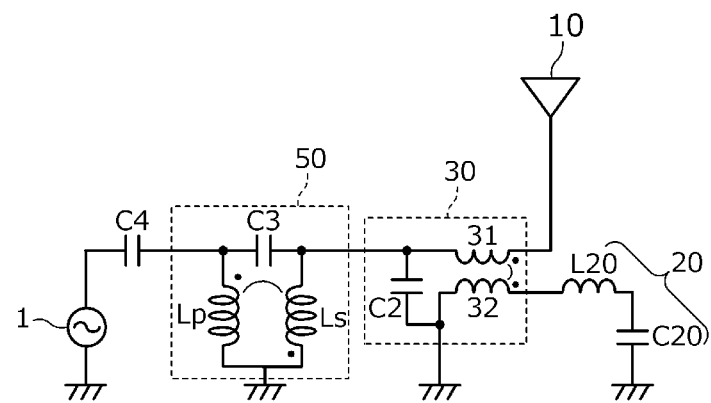
FIG. 45A is a circuit diagram of an antenna device to which the phase shifter 50 is added.
Figure 45B:
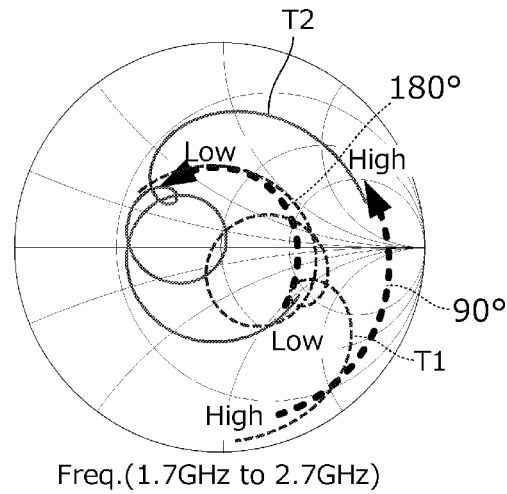
FIG. 45B illustrates impedance loci representing, on a Smith chart, impedances when seeing the antenna device from the feeder circuit 1.

FIG. 45A is a circuit diagram of an antenna device to which the phase shifter 50 is added, and FIG. 45B illustrates impedance loci representing, on a Smith chart, impedances when seeing the antenna device from the feeder circuit 1. This antenna device is a circuit not including the capacitor C5 in the circuit illustrated in FIG. 41.

Figure 46A:
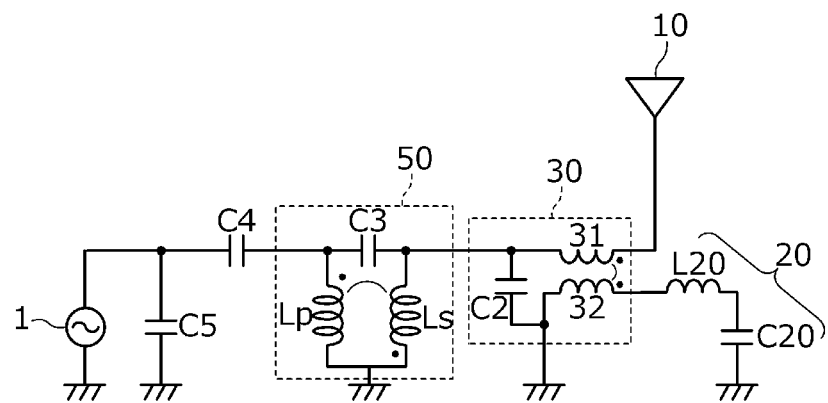
FIG. 46A is a circuit diagram of an antenna device including an impedance matching capacitor C5.
Figure 46B:
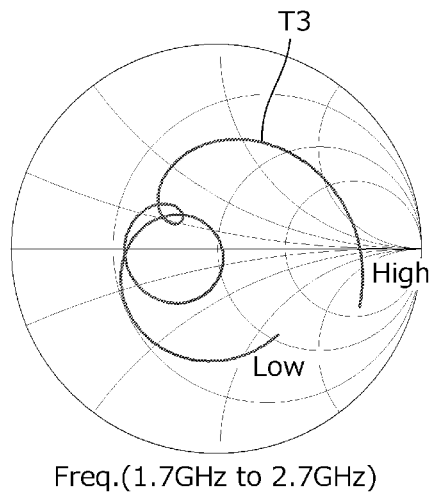
FIG. 46B illustrates an impedance locus representing, on a Smith chart, an impedance when seeing the antenna device from the feeder circuit 1.

FIG. 46A is a circuit diagram of an antenna device including the impedance matching capacitor C5 (as illustrated in FIG. 41), and FIG. 46B illustrates an impedance locus representing, on a Smith chart, an impedance when seeing the antenna device from the feeder circuit 1.

Figure 44B:
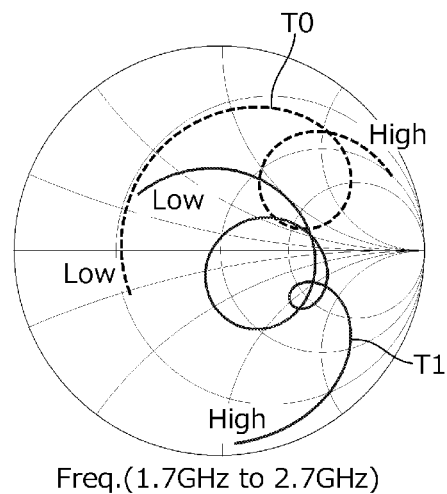
FIG. 44B illustrates impedance loci representing, on a Smith chart, impedances when seeing the antenna device from the feeder circuit 1.

In FIG. 44B, locus T0 is an impedance locus of an antenna device according to a comparative example in which the coupling circuit 30 and the parasitic resonant circuit 20 are not provided, and locus T1 is an impedance locus of the antenna device illustrated in FIG. 44A. Both are results obtained by a sweep from about 1.7 GHz to about 2.7 GHz. As is clear from FIG. 44B, by including the coupling circuit 30 and the parasitic resonant circuit 20, as described above, a pole (small loop on chart) is generated in the frequency characteristic of the antenna, and accordingly, the resonant frequency band moves toward the center of the chart. Note that a higher frequency band is still in a periphery of the chart, and it is discovered that matching is difficult in the high frequency band.

In FIG. 45B, locus T2 is an impedance locus of the antenna device including the phase shifter 50, the coupling circuit 30, and the parasitic resonant circuit 20, and locus T1 is the same as locus T1 illustrated in FIG. 44B. Both are results obtained by a sweep from about 1.7 GHz to about 2.7 GHz. As is clear from FIG. 45B, by including the phase shifter 50, a substantially 180° phase progresses in a low band, and a substantially 90° phase progresses in a high band. Accordingly, the high-frequency band also moves toward the center of the chart.

In FIG. 46B, locus T3 is an impedance locus of the antenna device illustrated in FIG. 46A, and is a result obtained by a sweep from about 1.7 GHz to about 2.7 GHz. As is clear from a comparison with locus T2 illustrated in FIG. 45B, due to the capacitor C5 that is shunt-connected, the high-frequency band rotates clockwise. Thus, matching is improved in all of the frequency bands.

Figure 47:
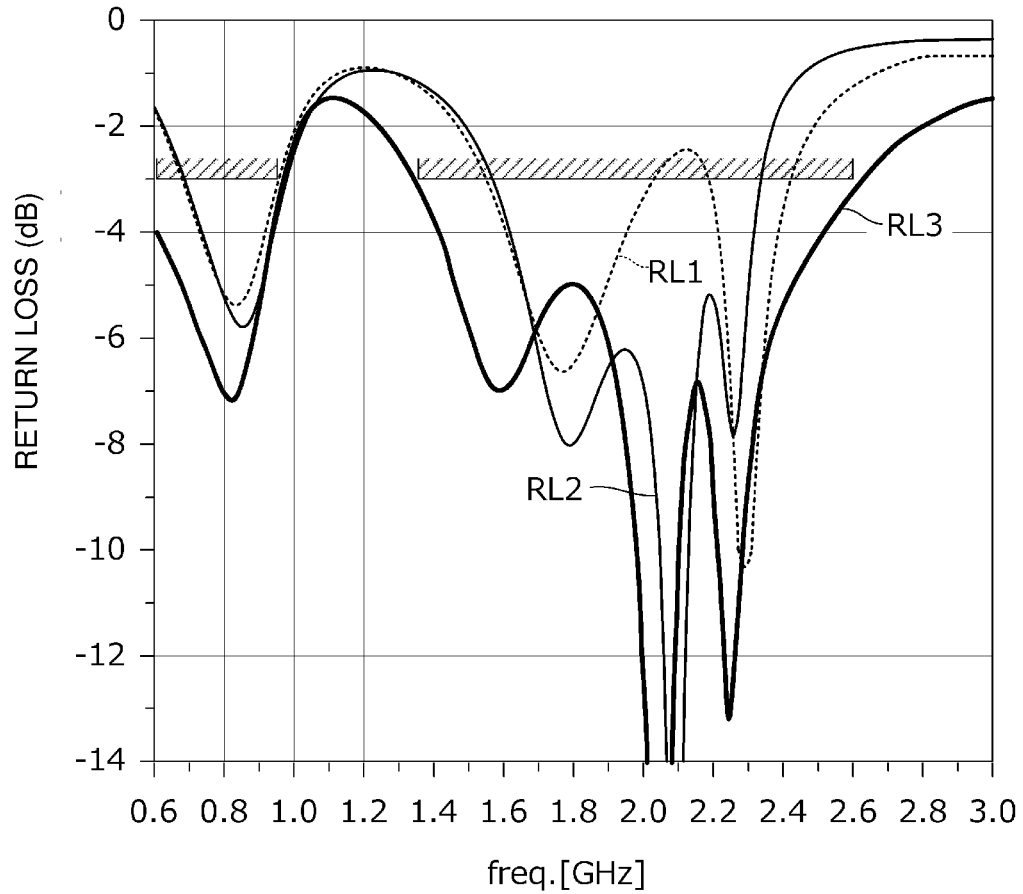
FIG. 47 illustrates a frequency characteristic of a return loss of the antenna devices illustrated in FIG. 44A and FIG. 46A and an antenna device according to a comparative example.

FIG. 47 illustrates a frequency characteristic of a return loss of the antenna devices illustrated in FIG. 44A and FIG. 46A and the antenna device according to the comparative example. In FIG. 47, a return loss characteristic RL1 is a return loss characteristic of the antenna device according to the comparative example, in which the coupling circuit 30 and the parasitic resonant circuit 20 are not included, a return loss characteristic RL2 is a return loss characteristic of the antenna device illustrated in FIG. 44A, and a return loss characteristic RL3 is a return loss characteristic of the antenna device illustrated in FIG. 46A. The return loss characteristics RL1 and RL2 in FIG. 47 are the same or substantially the same as those illustrated in FIG. 8. Comparing the return loss characteristics RL2 and RL3 with each other, it is discovered that the return loss is small in all bands and that the high band is broadened to a wide band of, for example, from about 1.4 GHz to about 2.6 GHz, while using the same radiating element.

Figure 48:
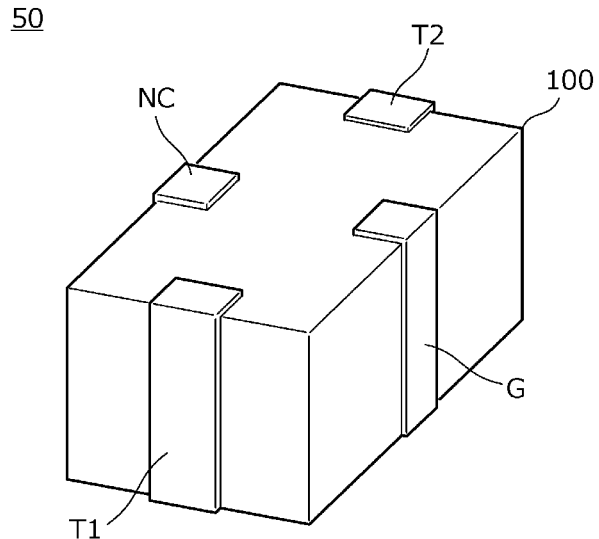
FIG. 48 is an external perspective view of the phase shifter 50.
Figure 49:
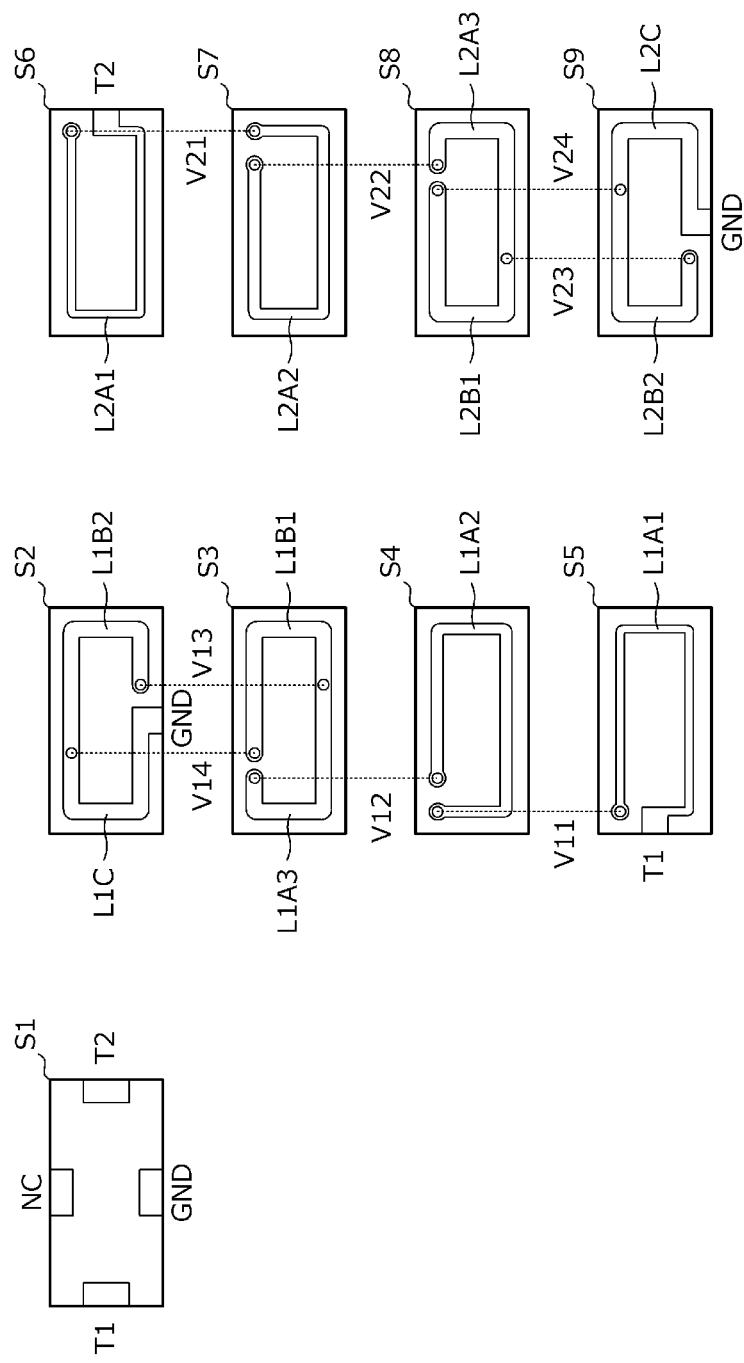
FIG. 49 is a plan view of layers in the phase shifter 50.
Figure 50:
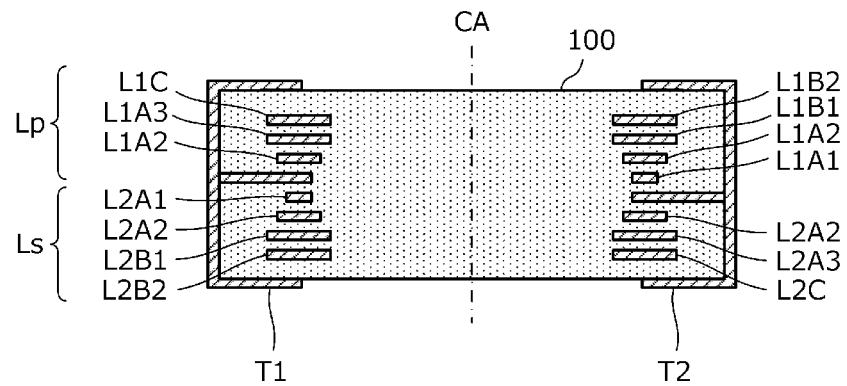
FIG. 50 is a sectional view of the phase shifter 50.
Figure 51:
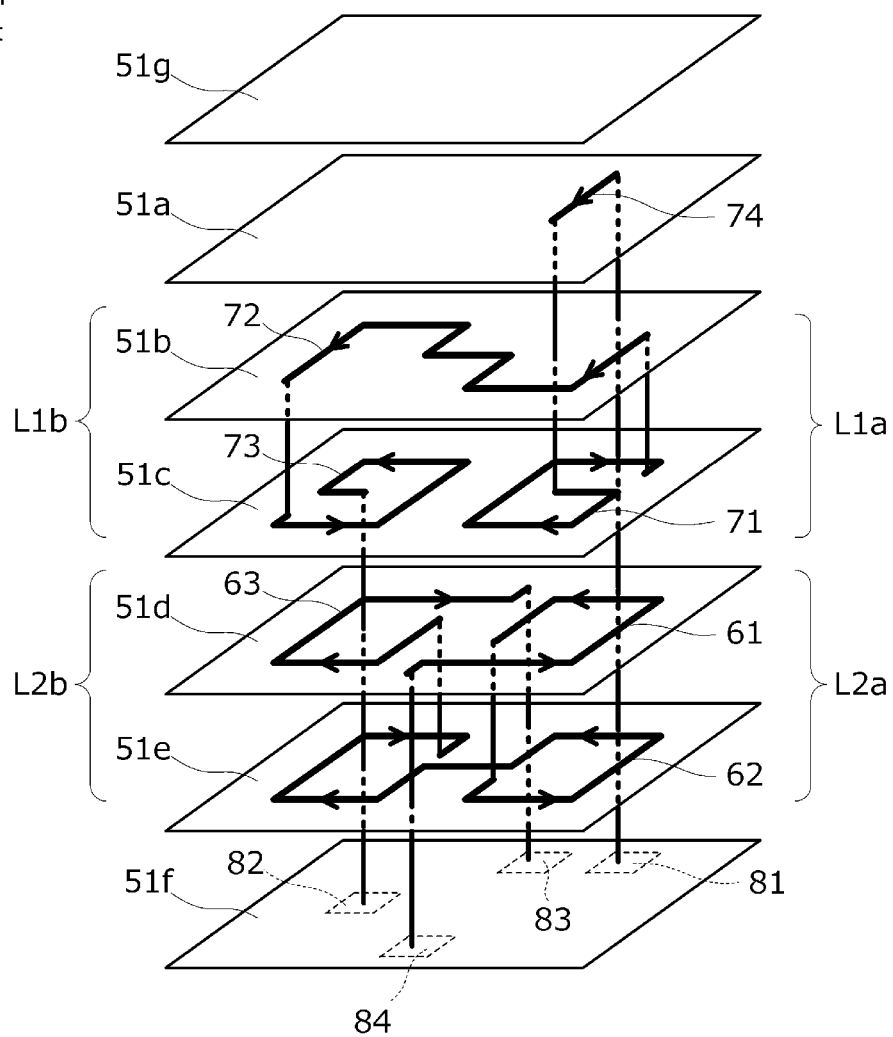
FIG. 51 illustrates an example of conductor patterns on layers in a case where a coupling degree adjustment circuit illustrated in International Publication No. 2012/153690 is formed on a multi-layer substrate.

FIG. 48 is an external perspective view of the phase shifter 50, and FIG. 49 is a plan view of layers in the phase shifter 50. In addition, FIG. 50 is a sectional view of the phase shifter 50.

A top surface of a material S1 corresponds to a mount surface (bottom surface) of a multi-layer body 100. On the material S1, a terminal T1 as a first port P1, a terminal T2 as a second port P2, a ground terminal G, and an open terminal NC are provided.

The material layers of the multi-layer body 100 may preferably be, for example, a non-magnetic ceramic multi-layer body made of LTCC or other suitable material or a resin multi-layer body made of a resin material, such as polyimide or liquid crystal polymer. In this manner, since the material layers are non-magnetic (not a magnetic ferrite), it is possible to use the material layers as a transformer and a phase shifter with a predetermined inductance and a predetermined coupling coefficient even in a high frequency band exceeding several hundreds of MHz.

Each of the conductor patterns and the interlayer connection conductors is preferably made of, for example, a conductor material including Ag or Cu as a main component and having a small resistivity. In a case in which the material layers are ceramic, for example, the conductor patterns and the interlayer connection conductors are formed by screen printing and firing of a conductive paste including Ag or Cu as a main component. In a case in which the material layers are resin, for example, the conductor patterns and the interlayer connection conductors are patterned by etching, for example, of a metal foil such as an Al foil or a Cu foil.

The phase shifter 50 includes a plurality of insulating materials S1 to S9. Various conductor patterns are provided on the insulating materials S1 to S9. The "various conductor patterns" include not only conductor patterns provided on surfaces of the materials but also interlayer connection conductors. The interlayer connection conductors include not only via conductors but also end surface electrodes provided on end surfaces of the multi-layer body.

The top surface of the material S1 corresponds to the mount surface (bottom surface) of the multi-layer body. On the material S1, the terminal T1 as the first port P1, the terminal T2 as the second port P2, the ground terminal G, and the open terminal NC are provided.

On the materials S5 and S4, conductors L1A1 and L1A2 are provided, respectively. On the material S3, conductors L1A3 and L1B1 are provided. On the material S2, conductors L1B2 and L1C are provided.

A first end of the conductor L1A1 is connected to the terminal T1 as the first port. A second end of the conductor L1A1 is connected to a first end of the conductor L1A2 via an interlayer connection conductor V11. A second end of the conductor L1A2 is connected to a first end of the conductor L1A3 via an interlayer connection conductor V12. A second end of the conductor L1A3 is connected to a first end of the conductor L1B1. The second end of the conductor L1A3 and the first end of the conductor L1B1 are connected to a first end of the conductor L1B2 via an interlayer connection conductor V13. A second end of the conductor L1B1 is connected to a second end of the conductor L1B2 via an interlayer connection conductor V14. The second end of the conductor L1B2 is connected to a first end of the conductor L1C. A second end of the conductor L1C is connected to the ground terminal G.

On the materials S6 and S7, conductors L2A1 and L2A2 are provided, respectively. On the material S8, conductors L2A3 and L2B1 are provided. On the material S9, conductors L2B2 and L2C are provided.

A first end of the conductor L2A1 is connected to the terminal T2 as the second port. A second end of the conductor L2A1 is connected to a first end of the conductor L2A2 via an interlayer connection conductor V21. A second end of the conductor L2A2 is connected to a first end of the conductor L2A3 via an interlayer connection conductor V22. A second end of the conductor L2A3 is connected to a first end of the conductor L2B1. The second end of the conductor L2A3 and the first end of the conductor L2B1 are connected to a first end of the conductor L2B2 via an interlayer connection conductor V23. A second end of the conductor L2B1 is connected to a second end of the conductor L2B2 via an interlayer connection conductor V24. The second end of the conductor L2B2 is connected to a first end of the conductor L2C. A second end of the conductor L2C is connected to the ground terminal G.

The conductors L1A1, L1A2, L1A3, L1B1, L1B2, and L1C and the interlayer connection conductors V11, V12, V13, and V14 define the first coil Lp. In addition, the conductors L2A1, L2A2, L2A3, L2B1, L2B2, and L2C and the interlayer connection conductors V21, V22, V23, and V24 define the second coil Ls. Both of the first coil Lp and the second coil Ls are preferably rectangular or substantially rectangular helical coils, for example.

The above-described preferred embodiments have illustrated examples in which the rectangular or substantially rectangular helical first coil is defined by the first conductor pattern and the second conductor pattern and in which the rectangular or substantially rectangular helical second coil is defined by the third conductor pattern and the fourth conductor pattern. However, a planar shape of each of the conductor patterns may be a circle, an ellipse, an oval, a square with rounded corners, and other suitable shapes, for example.

In the above-described examples, examples of using fundamental wave resonance of the parasitic resonant circuit 20 have mainly been described. However, any harmonic resonance of the parasitic resonant circuit 20, such as double-wave resonance (secondary resonance), triple-wave resonance (tertiary resonance), or 3/2-wave resonance, for example, may also be used. In addition, both of the fundamental wave resonance and the harmonic resonance may be used, or a plurality of harmonic resonances may be used.

As for the radiating element 10, similarly, any harmonic resonance such as double-wave resonance (secondary resonance), triple-wave resonance (tertiary resonance), or 3/2-wave resonance, for example, may also be used. In addition, both of the fundamental wave resonance and the harmonic resonance may be used, or a plurality of harmonic resonances may be used.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A magnetic field coupling element comprising:
    a multi-layer body including a plurality of insulating layers;
    a plurality of conductor patterns provided in a plurality of layers that are stacked with respective insulating layers among the plurality of insulating layers interposed therebetween; and
    a plurality of interlayer connection conductors that inter-connect the plurality of conductor patterns at predetermined positions; wherein
    the plurality of conductor patterns include a first conductor pattern, a second conductor pattern, a third conductor pattern, and a fourth conductor pattern that are disposed on different layers in order in a direction of stacking;
    the plurality of interlayer connection conductors include a first interlayer connection conductor and a second interlayer connection conductor, the first interlayer connection conductor inter-connecting the first conductor pattern and the second conductor pattern to each other, and the second interlayer connection conductor inter-connecting the third conductor pattern and the fourth conductor pattern to each other;
    the first conductor pattern, the second conductor pattern, and the first interlayer connection conductor define a first coil;
    the third conductor pattern, the fourth conductor pattern, and the second interlayer connection conductor define a second coil;
    the first coil and the second coil are disposed in a region of less than about ⅓ of a stacking height of the multi-layer body including the plurality of insulating layers in the direction of the stacking; and
    the first interlayer connection conductor and the second interlayer connection conductor are disposed in the direction of the stacking with at least one insulating layer among the plurality of insulating layers interposed therebetween.

2. The magnetic field coupling element according to claim 1, wherein the first interlayer connection conductor and the second interlayer connection conductor overlap with each other in a plan view of the plurality of insulating layers.

3. The magnetic field coupling element according to claim 1, wherein the first conductor pattern and the fourth conductor pattern include a smaller number of turns than the second conductor pattern and the third conductor pattern.

4. The magnetic field coupling element according to claim 1, wherein at least one of the second conductor pattern and the third conductor pattern includes a capacitance formation conductor pattern facing in the direction of the stacking and that partially defines a capacitance.

5. The magnetic field coupling element according to claim 4, wherein one conductor pattern of the second conductor pattern and the third conductor pattern includes a lead conductor pattern that extends an end portion of the insulating layers, and another conductor pattern of the second conductor pattern and the third conductor pattern includes a capacitance formation conductor pattern facing the lead conductor pattern.

6. The magnetic field coupling element according to claim 1, wherein
    the multi-layer body has a rectangular or substantially rectangular parallelepiped shape;
    the multi-layer body includes a first surface and a second surface opposite to the first surface; and
    a terminal connected to a first end of the first coil, a terminal connected to a second end of the first coil, a terminal connected to a first end of the second coil, and a terminal connected to a second end of the second coil are individually provided on the first surface and the second surface.

7. An antenna device comprising:
    a magnetic field coupling element including:
        a multi-layer body including a plurality of insulating layers;
        a plurality of conductor patterns provided in a plurality of layers that are stacked with respective insulating layers among the plurality of insulating layers interposed therebetween; and
        a plurality of interlayer connection conductors that inter-connect the plurality of conductor patterns at predetermined positions; wherein
        the plurality of conductor patterns include a first conductor pattern, a second conductor pattern, a third conductor pattern, and a fourth conductor pattern that are disposed on different layers in order in a direction of stacking;
        the plurality of interlayer connection conductors include a first interlayer connection conductor and a second interlayer connection conductor, the first interlayer connection conductor inter-connecting the first conductor pattern and the second conductor pattern to each other, and the second interlayer connection conductor inter-connecting the third conductor pattern and the fourth conductor pattern to each other;

the first conductor pattern, the second conductor pattern, and the first interlayer connection conductor define a first coil;

the third conductor pattern, the fourth conductor pattern, and the second interlayer connection conductor define a second coil; and the first coil and the second coil are disposed in a region of less than about ⅓ of a stacking height of the multi-layer body including the plurality of insulating layers in the direction of the stacking;

a radiating element connected to the first end of the first coil; and a parasitic resonant circuit connected to the first end of the second coil; wherein the second end of the first coil is a feeder circuit connection portion; and the second end of the second coil is connected to a ground.

8. The antenna device according to claim 7, wherein a winding direction of the first coil from the second end to the first end and a winding direction of the second coil from the first end to the second end are opposite to each other.

9. The antenna device according to claim 7, further comprising a phase shifter that is connected between the feeder circuit connection portion and the first coil and that has a frequency dependency.

10. The antenna device according to claim 7, wherein
a second terminal of the second coil is connected to the ground, the second terminal being opposite to a first terminal to which the parasitic resonant circuit is connected; and
a length of a line between the first coil and the feeder circuit and a length of a line between the second terminal of the second coil and the ground are less than about ⅛ wavelength of a resonant frequency.

11. The antenna device according to claim 7, the parasitic resonant circuit is defined by a linear conductor pattern.

12. The antenna device according to claim 7, wherein the parasitic resonant circuit resonates to define a radiating element.

13. The antenna device according to claim 7, further comprising a parasitic radiating element.

14. The antenna device according to claim 7, further comprising:
a second magnetic field coupling element including a third coil and a fourth coil, the third coil being connected between the first coil and the feeder circuit, the fourth coil being coupled to the third coil; and
a second parasitic resonant circuit connected to the fourth coil.

15. The antenna device according to claim 7, further comprising:
a second magnetic field coupling element including a third coil and a fourth coil, the third coil being connected between the second coil and the parasitic resonant circuit, the fourth coil being coupled to the third coil; and
a second parasitic resonant circuit connected to the fourth coil.

16. The antenna device according to claim 7, further comprising a switch connected between the parasitic resonant circuit and the ground.

17. The antenna device according to claim 7, wherein
the magnetic field coupling element includes a parasitic capacitance; and
the antenna device includes an inductor that is connected to the magnetic field coupling element and that reduces or prevents a reactance component generated in the magnetic field coupling element by parallel resonance with the parasitic capacitance.

18. The antenna device according to claim 7, wherein
the radiating element is connected to the first end of the first coil at a first portion and is connected to the feeder circuit at a second portion.

19. Electronic equipment comprising:
the antenna device according to claim 7;
a feeder circuit that is connected to the magnetic field coupling element; and
a housing in which the feeder circuit is disposed; wherein
a portion of the radiating element or an entirety of the radiating element is defined by a portion of the housing.

20. A magnetic field coupling element comprising:
a multi-layer body including a plurality of insulating layers;
a plurality of conductor patterns provided in a plurality of layers that are stacked with respective insulating layers among the plurality of insulating layers interposed therebetween; and
a plurality of interlayer connection conductors that interconnect the plurality of conductor patterns at predetermined positions; wherein
the plurality of conductor patterns include a first conductor pattern, a second conductor pattern, a third conductor pattern, and a fourth conductor pattern that are disposed on different layers in order in a direction of stacking;
the plurality of interlayer connection conductors include a first interlayer connection conductor and a second interlayer connection conductor, the first interlayer connection conductor inter-connecting the first conductor pattern and the second conductor pattern to each other, and the second interlayer connection conductor inter-connecting the third conductor pattern and the fourth conductor pattern to each other;
the first conductor pattern, the second conductor pattern, and the first interlayer connection conductor define a first coil;
the third conductor pattern, the fourth conductor pattern, and the second interlayer connection conductor define a second coil;
the first coil and the second coil are disposed in a region of less than about ⅓ of a stacking height of the multi-layer body including the plurality of insulating layers in the direction of the stacking; and
the first coil and the second coil are the only coils included in the magnetic field coupling element.

* * * * *